(12) United States Patent
Sharma et al.

(10) Patent No.: US 9,824,412 B2
(45) Date of Patent: Nov. 21, 2017

(54) POSITION-ONLY SHADING PIPELINE

(71) Applicant: Intel Corporation, Santa Clara, CA (US)

(72) Inventors: Saurabh Sharma, El Dorado Hills, CA (US); Subramaniam Maiyuran, Gold River, CA (US); Thomas A. Piazza, Granite Bay, CA (US); Kalyan K. Bhiravabhatla, Bangalore (IN); Peter L. Doyle, El Dorado Hills, CA (US); Paul A. Johnson, Folsom, CA (US); Bimal Poddar, El Dorado Hills, CA (US); Jon N. Hasselgren, Bunkeflostrand (SE); Carl J. Munkberg, Malmo (SE); Tomas G. Akenine-Moller, Lund (SE); Harri Syrja, Klaukkala (FI); Kevin Rogovin, Tammisaari (FI); Robert L. Farrell, Granite Bay, CA (US)

(73) Assignee: Intel Corporation, Santa Clara, CA (US)

( * ) Notice: Subject to any disclaimer, the term of this patent is extended or adjusted under 35 U.S.C. 154(b) by 230 days.

(21) Appl. No.: 14/494,653

(22) Filed: Sep. 24, 2014

(65) Prior Publication Data

US 2016/0086299 A1  Mar. 24, 2016

(51) Int. Cl.
*G06T 15/40* (2011.01)
*G06T 1/20* (2006.01)
(Continued)

(52) U.S. Cl.
CPC .............. *G06T 1/20* (2013.01); *G06T 15/405* (2013.01); *G06T 15/40* (2013.01); *G06T 15/503* (2013.01); *G09G 5/393* (2013.01)

(58) Field of Classification Search
CPC ..... G06T 15/405; G06T 15/40; G06T 15/005; G06T 15/503; G09G 5/393
See application file for complete search history.

(56) References Cited

U.S. PATENT DOCUMENTS 6,476,807 B1 * 11/2002 Duluk, Jr. ................. G06T 1/60
 345/421
6,664,957 B1 * 12/2003 Sato ........................ G06T 15/40
 345/420

(Continued)

OTHER PUBLICATIONS

International Search Report and Written Opinion in corresponding PCT application No. PCT/US2015/046669 dated Feb. 16, 2016.

(Continued)

*Primary Examiner* — Abderrahim Merouan
(74) *Attorney, Agent, or Firm* — Trop Pruner & Hu, P.C.

(57) ABSTRACT

In position-only shading, two geometry pipes exist, a trimmed down version called the Cull Pipe and a full version called the Replay Pipe. Thus, the Cull Pipe executes the position shaders in parallel with the main application, but typically generates the critical results much faster as it fetches and shades only the position attribute of the vertices and avoids the rasterization as well as the rendering of pixels for the frame buffer. Furthermore, the Cull Pipe uses these critical results to compute visibility information for all the triangles whether they are culled or not. On the other hand, the Replay Pipe consumes the visibility information to skip the culled triangles and shades only the visible triangles that are finally passed to the rasterization phase. Together the two pipes can hide the long cull runs of discarded triangles and can complete the work faster in some embodiments.

55 Claims, 14 Drawing Sheets

(51) Int. Cl.
*G06T 15/50* (2011.01)
*G09G 5/393* (2006.01)

(56) References Cited

U.S. PATENT DOCUMENTS

| | | | | |
|---|---|---|---|---|
| 6,734,861 | B1* | 5/2004 | Van Dyke | G06T 15/005 345/506 |
| 6,912,293 | B1* | 6/2005 | Korobkin | G06T 17/10 345/420 |
| 8,102,393 | B1* | 1/2012 | Everitt | G06T 15/005 345/421 |
| 8,369,610 | B1* | 2/2013 | Korobkin | G06T 17/10 382/154 |
| 8,564,616 | B1* | 10/2013 | Hakura | G09G 5/363 345/620 |
| 8,593,466 | B2* | 11/2013 | Barringer | G06T 15/005 345/502 |
| 8,933,943 | B2* | 1/2015 | Soupikov | G06T 15/005 345/502 |
| 9,183,608 | B2* | 11/2015 | Akenine-Moller | G06T 11/40 |
| 2005/0195186 | A1* | 9/2005 | Mitchell | G06T 15/40 345/421 |
| 2009/0109219 | A1 | 4/2009 | DeCoro et al. | |
| 2010/0097377 | A1* | 4/2010 | Hasselgren | G06T 11/40 345/426 |
| 2011/0102437 | A1* | 5/2011 | Akenine-Moller | G06T 15/005 345/426 |
| 2011/0175911 | A1 | 7/2011 | Loop et al. | |
| 2011/0267346 | A1* | 11/2011 | Howson | G06T 15/005 345/423 |
| 2012/0069021 | A1* | 3/2012 | Son | G06T 15/40 345/426 |
| 2012/0081370 | A1 | 4/2012 | Min et al. | |
| 2012/0212488 | A1* | 8/2012 | Yu | G06T 15/40 345/422 |
| 2013/0058537 | A1* | 3/2013 | Chertok | G06K 9/3233 382/106 |
| 2013/0300754 | A1* | 11/2013 | Everitt | G06T 15/005 345/522 |
| 2014/0292771 | A1* | 10/2014 | Kubisch | G06T 1/20 345/501 |
| 2015/0179142 | A1* | 6/2015 | Lehtinen | G06T 15/005 345/589 |
| 2015/0187125 | A1* | 7/2015 | Hasselgren | G06T 15/405 345/422 |
| 2015/0269771 | A1* | 9/2015 | Hasselgren | G06T 15/005 345/422 |
| 2015/0379681 | A1* | 12/2015 | Akenine-Moller | G06T 1/60 345/555 |

OTHER PUBLICATIONS

International Preliminary Report on Patentability in corresponding PCT application No. PCT/US2015/046669 dated Apr. 6, 2017.

\* cited by examiner

US 9,824,412 B2

POSITION-ONLY SHADING PIPELINE

BACKGROUND

This relates to graphics processing.

Contemporary graphics processing architectures follow a virtual pipeline in which triangles are processed in-order. The vertices are transformed via shaders, then the triangle goes through the setup and rasterization stage to produce pixels, which are then shaded and written to a frame buffer. However, only a fraction of triangles are required to render the correct image on any frame buffer. For example, some triangle sequences have no visible impact and are discarded even before the rasterization phase. These sequences are either dropped via the viewport frustum discards or are back face culled via the graphics pipeline. Moreover, the discarded triangle sequences follow the burst characteristics where the size of the burst can go more than 10,000 triangles, starving both the pixel pipe and the compute clusters.

BRIEF DESCRIPTION OF THE DRAWINGS

Some embodiments are described with respect to the following figures.

DETAILED DESCRIPTION

Figure 1:
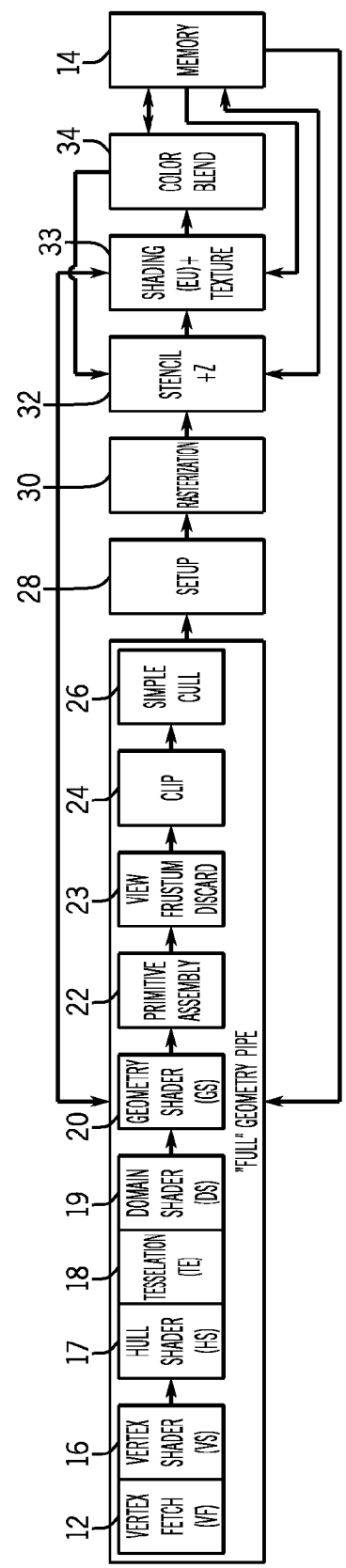
FIG. 1 is a simplified baseline architecture for some embodiments.

A mechanism that completely hides the long running discard sequences would improve performance. Unfortunately, one cannot know for certain that any particular triangle sequence can be validly skipped without fetching and shading (executing) the position attribute of the vertices. Since shading of positions is critical in deciding whether the triangle can be dropped or not, the graphics processing unit (GPU) should prioritize the shading of positions. For example, in the modern GPU architectures the vertex computation involves fetching of vertex attributes (like position, color, texture-coordinates etc.) from memory and then shading them with the help of vertex shaders. The computation of critical instructions may be separated from the vertex shaders that calculate the position attribute—i.e. the position shaders. If the calculation of the critical results happens much faster, the results can be used for hiding the cull sequences. In short, it is desirable to "pre-execute" the position shaders to effectively consume latency on behalf of the main application.

In position-only shading, two geometry pipes exist, a trimmed down version called the Cull Pipe and a full version called the Replay Pipe. Both of the pipes execute different instances of the same application and each instance has its own context. Thus, the Cull Pipe executes the position shaders in parallel with the main application, but typically generates the critical results much faster as it fetches and shades only the position attribute of the vertices and avoids the rasterization as well as the rendering of pixels for the frame buffer. Furthermore, the Cull Pipe uses these critical results to compute visibility information for all the triangles whether they are culled or not. On the other hand, the Replay Pipe consumes the visibility information to skip the culled triangles and shades only the visible triangles that are finally passed to the rasterization phase. Together the two pipes can hide the long cull runs of discarded triangles and can complete the work faster in some embodiments.

In addition to potential performance improvements, position-only shading also provides opportunity to save power and enhances the scalability of the architecture. Following are some contributions of some embodiments:

Position-only shading can completely hide the long cull sequences of triangles embedded in the applications in some embodiments. These cull runs have a tendency to inefficiently utilize the GPU resources by starving the pixel pipe and computes present in the system. With the help of position-only shading, the long cull runs may be completely suppressed and the bottleneck shifts from the geometry pipe to the pixel pipe providing performance improvements in some embodiments.

The resources inside GPU may be utilized via the Cull Pipe such that it can complete the computation of critical work faster.

Further, the position-only shading architecture can save energy in some embodiments—i.e. the energy savings obtained by fetching fewer attributes as well as executing fewer dynamic instructions for the culled triangles.

Position-only shading can provide more scalability for higher volume products—i.e. by shifting the bottleneck from the geometry pipe to the pixel pipe, the scalability problem can be translated by increasing the pixel and compute throughput to match the architectural requirements.

Figure 2:
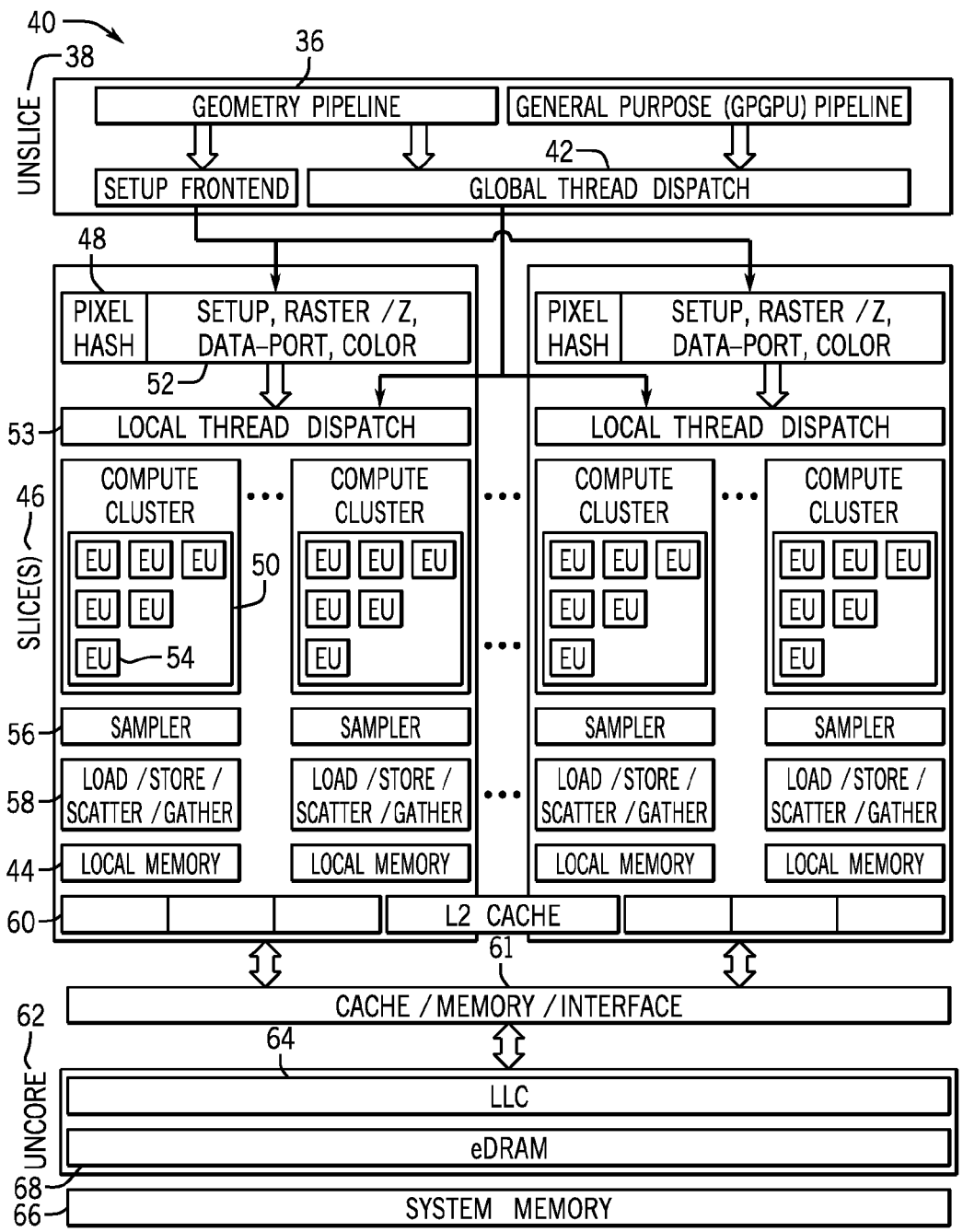
FIG. 2 is more detailed architecture for some embodiments.

FIG. 1 is a simplistic view of the baseline architecture that matches the application program interface (API) and the programming model while FIG. 2 exhibits a more detailed microarchitecture of a baseline GPU according to one embodiment. The GPU is a unified shader model including three parts: Unslice, Slice and Uncore.

Usually, a 3D scene starts out as a collection of triangulated surfaces where vertices of the triangles define the shape of the object. These input lists of vertices are fed to the vertex fetch (VF) unit 12 that in turn fetches the attributes associated with the vertices from memory 14. In vertex shader (VS) unit 16, the fetched attributes of the vertices are transformed using the programmable shaders. One can think of these programmable shaders as subroutines that map vertices onto the screen and add special effects to the objects in a 3D environment by performing mathematical operations on their attributes. These shaders are dispatched to the thread processors—referred to as execution units (EUs)—where the attributes of vertices (like position, color, texture-coordinates etc.) are transformed and the computed values are stored in the local memory for reference by the subsequent pipe stages.

The output of the VS unit goes to the next pipeline stages, which are hull shader 17, tessellation 18, domain shader 19 and geometry shader 20 if applicable or sent to the primitive assembly unit 22 where the triangles are created. After creation of the triangles comes the clipping stage 24 where the triangles that are outside the viewport frustum, as determined in the viewport frustum discard 23, are discarded. On the other hand, the triangles that are within the planes of the viewport frustum are accepted and sent to the subsequent pipe stages. Moreover, the clipping stage can also clip the triangles that intersect with the planes of the view frustum.

The triangles that survived the viewport frustum discards 23 are yet again examined by the simple cull stage 26 to confirm whether the triangle will be part of the final image or not, and the objects that fail these tests are thrown away. For example, the back facing, degenerate, zero area etc. triangles are discarded in this stage. For some applications more than about 80% of the triangles are discarded either by the viewport frustum or simple cull stage. Finally, the passing triangles are sent to the setup and rasterization units 28 and 30.

The second part of the baseline architecture is the pixel pipe that contains the rasterization 30, depth 32, the shading and texture 33 and color clusters 34. The pixel pipe begins with the rasterization unit 30 that determines the location of all the pixels that either lie inside or on the edges of the triangles sent by the geometry pipe. Further, it divides the triangles into symmetrical blocks of pixels that are sent to the depth (Z) pipe 32 for depth test. As multiple objects in the 3D scene can map to the same position, the depth pipe determines whether the pixels embedded in the block are closest to the observer or are hidden by the previously observed pixels belonging to a different object. The pixels that pass the depth tests are shaded (shading and texture 33) for determining their color and other attributes related to them. Finally, the computed values of the pixels are sent to the color pipe 34 that can either optionally blend the computed values with the previously known states or send them to update the frame buffer.

As shown in FIG. 2, the geometry pipeline 36 from VF stage to the simple cull stage is present in the Unslice portion 38 of the architecture 40. The programmable shaders emanating from the geometry pipe are dispatched to the thread processor via global thread dispatch 42 and the computed values are recorded in the local memory 44. The passing triangles from the geometry pipe are shipped to the Slices 46 where they are divided into symmetrical blocks of pixels via the rasterization walk. The pixel blocks are hashed via the pixel hashing mechanism 48 to decide whether the block is going to be rendered in the slice or not. The hashing mechanism is responsible not only for the load-balance but also to maintain the pixel-coherency.

As described earlier, multiple triangles in a 3D scene can overlap and it is incumbent upon the hashing mechanism to send the pixel block at a given screen coordinate to the same Slice as well as the same compute cluster 50 via a local thread dispatch 53. This is done in order to maintain the depth and the color coherency of the pixels. Further, the Slice portion of the architecture can be divided into two functional blocks, pixel pipe 52 and compute clusters 50. As mentioned before, the pixel pipe contains the rasterization, depth and color cluster while the compute cluster encompasses the array of Execution Units (EU) 54 used for executing programmable shaders. Each EU can support multiple thread contexts with different Single Instruction Multiple Data (SIMD) widths—i.e. 8, 16 or 32 in one embodiment. Internally, it has two pipes that are quad-pumped. Each pipe has four-stream SIMD processors and can execute both floating point and scalar instructions. Each compute cluster also has a shared texture-sampling unit 56 and a load/store unit 58 that can do gathered reads as well as scattered writes. In addition, the shared functions have their own private caches backed up by the unified L2 cache 60 as shown in FIG. 2. Finally, similar architecture generations try to satisfy diverse market segments—i.e. from phone/tablet solution to high-end gaming computers. Thus, same architecture generation might have products that have different numbers of compute clusters and Slices.

The Uncore 62 encompasses the cache/memory interface 61, the last level cache(s) (LLCs) 64 as well as the memory 66. Just like the Slices, the Uncore configuration is also dependent upon the market segment. For example, high end configurations may have a last level cache along with embedded-DRAM (eDRAM) 68 while the configuration for a phone/tablet may have a memory controller and system memory.

As discussed previously, contemporary GPU architectures fetch and shade all the attributes of the vertices. However, most of the vertices are rejected either via viewport frustum or simple cull discards. The goal here is to do less work for the discard cases—i.e. only fetch and shade attributes that are required for deciding whether the triangle will be dropped or not. A GPU should prioritize the shading of position, over the rest of the attributes because position alone is required for determining whether a triangle is culled or not.

Typically, the shading attributes include position, normal, color and texture coordinates as examples. In some embodiments when position-only shading is to be implemented, it is only necessary to read the position attributes from memory rather than reading all the attributes and then selecting the position attributes out. This saves time, compute cycles and memory bandwidth in some embodiments. Thus in some embodiments, during the vertex fetch, only the position attributes are fetched by the culling pipe.

The contemporary GPU architectures are executing extra instructions for discarded triangles. Similar to dynamic instructions, contemporary GPU architectures are fetching a large number of unnecessary and/or used attributes for the culled vertices. The GPU should prioritize the shading of position over the rest of the vertex attributes.

The first step is to prioritize the critical instructions embedded in the vertex shader to compute the position attribute and execute them in the GPU pipeline as early as possible. Firstly, a jitter/driver combo of GPU identifies the critical instructions, and secondly, the hardware pipeline of geometry stage is adjusted to execute these instructions earlier in the pipe. These critical instructions are called position shaders. The position shaders are used for fetching fewer attributes and executing fewer instructions for discarded vertices.

Another issue is that the discarded triangle sequences have burst characteristics where the size of the burst can be larger than 10,000 triangles. The implication of this behavior is that, for long periods of time, the geometry pipe will be busy rejecting triangles while the pixel pipe will be idle. Moreover, the complexity of the vertex shaders in terms of dynamic instructions is considerably less than the pixel shaders and hence the compute clusters will also be starved for the long running cull sequences. The efficacy of the system can be improved by completely hiding these long running discard sequences in some embodiments.

The computation of position shaders is decoupled further in time such that it can effectively hide the cull sequences. A mechanism "pre-executes" the position shaders and effectively consumes its latency on behalf of the main application such that long running culled sequences can be skipped. In short, a position-only shader can not only realize performance gains but also saves power by doing less work for discarded vertices in some embodiments.

Fetching and shading only position attributes for discarded objects reduces the energy footprint of the system. Skipping the wasteful work enhances the efficiency of the system by keeping the pixel pipe and compute clusters busy.

Figure 3:
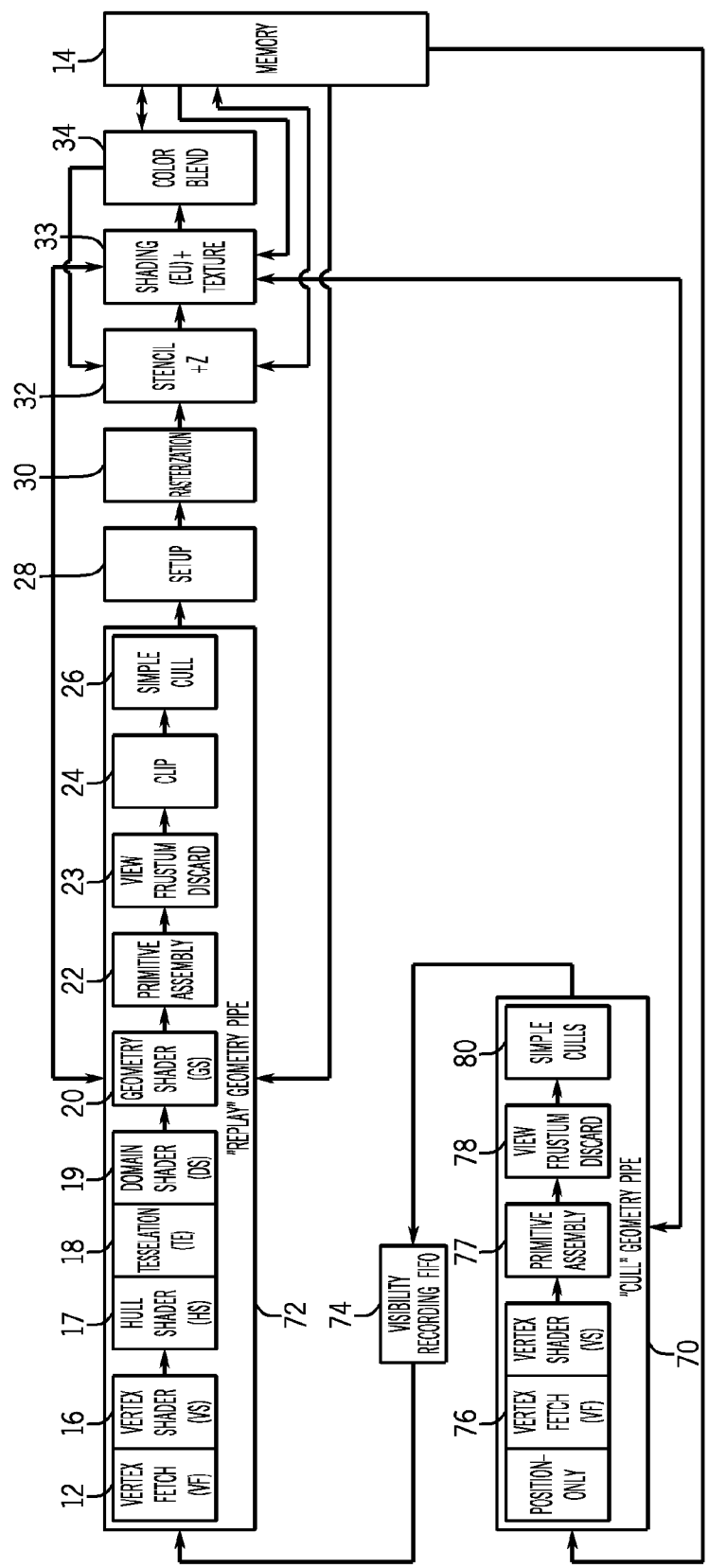
FIG. 3 is a block diagram of one embodiment of the architecture.

FIG. 3 shows a simplified block diagram of an architecture that has two geometry pipes—the Cull Pipe 70 and the Replay Pipe 72. Both the pipes execute different instances of the same application where each instance can be working on a completely different draw call. The responsibility of the Cull Pipe is to compute the visibility information of the triangles whether the triangle is rejected or not. This information is stored in the Visibility Recording First In First Out (FIFO) 74 that in turn is consumed by the Replay Pipe for skipping the discarded triangles. Moreover, the Cull Pipe generates this critical information faster by only fetching and shading the position attributes. In this way, both the pipes work together to reduce the amount of work required for the culled triangle sequences and also to skip them efficiently.

As shown in FIG. 3, the Cull Pipe is shallow as well as leaner when compared to the Replay Pipe. It has a position-only VF-VS stage 76 for shading the position attributes followed by the primitive assembly 77 and viewport frustum discard stage 78 and the simple cull stage 80. In other words, the instruction set in the culling pipe only includes those instructions needed for calculating position attributes and does not have the instruction for calculating other shader attributes. This shallow pipeline computes the visibility information for each triangle of a draw call and records this information in a chronological order inside the visibility recording FIFO. The recorded information is kept as a bitwise sequence, for example using 0 for the failing triangle and 1 for the passing triangle and, thus uses a small amount of storage area in some embodiments. The Cull Pipe may run at least one draw call ahead such that the Replay Pipe is not starved for the visibility information. Usually, a 3D frame is made up of varying numbers of render-passes that work on a given render-target(s). A frame ends in the composition phase where the intermediate information recorded in the render targets is blended together to generate the final frame buffer. Each render pass has an arbitrary number of draw calls that in turn is actually a collection of triangulated surfaces that define the shape of the object. Since the cull pipe avoids the rasterization as well as the rendering of pixels for a draw call, it can run ahead and compute the visibility information in a timely manner. However, if the information for a draw call is not available then the replay pipe may stall. Similarly, if there is no room in the visibility recording FIFO then the cull pipe may stall.

Some of the important pipe stages like tessellation and geometry-shader are missing from the Cull Pipe in some embodiments. It is natural to ask what happens to the draw calls that require tessellation, geometry shader or both. The Cull Pipe skips the draw calls that have these states enabled and in turn the Replay Pipe will handle them in a regular manner—i.e. replay pipe will not be expecting the visibility recording for these draw calls. To accomplish this, a driver sets a bit in the draw call command i.e. whether the command comes into the domain of cull pipe or not. Similarly, there can be conditions when the vertex-only draw calls require information that is computed via the pixel shaders of the previous draw calls. This happens very rarely in applications but the driver still sets the bit indicating that these kinds of draw calls will not be handled via the Cull Pipe. These are few of the reasons why the Replay Pipe still has the discard logic 23 present in its pipeline, because for all the other cases the replay pipe will be working only on the visible triangles and for them the discard logic is not required.

Finally, there is not a regular clipping stage present in the cull pipe in one embodiment, so the triangles that intersect with the view frustum planes will be treated as passed (i.e. they can be marked as visible in the culling pipe), then the replay pipe handles all of the primitive clipping.

As explained earlier, the visibility FIFO may record the information as bitwise sequence for every triangle of a draw call—i.e. 0 for the failing triangle while 1 for a passing triangle. This information present in the FIFO is generated via the cull pipe and is consumed by the replay pipe for skipping the discarded triangles. Thus, the size of the FIFO governs how far the cull pipe can run ahead, and hence, can impact the performance of the architecture.

The visibility FIFO can record 256K bytes worth of vertex information can provide optimal performance in some embodiments. This information may be bounded by two scenarios and are elaborated below:

Strip Case: Each vertex is a triangle then we need: 256K/(8×1024)=>32 KB

List Case: When three vertices make a triangle: 256K/(3×8×1024)=>~11 KB

In some instances, a draw call driver can choose to enable or disable visibility recording. For example if there are only a few vertices in the draw call, the overhead associated with visibility recording may not justify the cost of visibility recording in terms of time, memory bandwidth and compute cycles. Other examples where visibility recording may be disabled for a particular draw call include lines and cases where all the vertices in the draw call are known to be visible.

The local memory is used for recording the shaded attributes of the vertices that are referenced both by the discarding logic in the geometry pipe as well as the pixel pipe for rendering pixels. Recall that vertices can have arbitrary number of attributes like position, normal, color, texture-coordinates etc. These attributes are shaded with the help of vertex shaders and the outcomes are recorded in the local memory for future reference. The recorded information is dereferenced whenever it is no longer required—for example, when the triangle is discarded by the culling logic or when all the pixels for a given triangles are rendered. This local memory may be a free-list of registers that are allocated for a vertex and then finally returned to the pool when not required.

In the case of cull pipe, the local memory records attributes that are needed for computing positions of the vertices. Furthermore, the lifetime of these local memory registers is short when compared to the base model because all the triangles are dropped at the end of the cull pipe. However, the capacity of the local memory can still impact the performance of the architecture. The ideal capacity is a function of the execution latency of the position shaders, which not only depends on the number of dynamic instructions present in the position shader but also depends on the demand on the compute clusters by other resources like pixel shaders and shaders emanating from the replay pipe. Thus, if the cull pipe is inappropriately sized, this can thwart the forward progress of cull pipe, and hence, the overall performance.

The Cull Pipe can use 64 KB worth of local memory to stream properly in some embodiments.

This architecture fetches and shades only position attributes for the discarded objects, and secondly, it can tolerate the long running cull sequences by skipping them. The first aspect reduces the amount of work while the second aspect reduces the amount of time to render a frame, and hence, helps in decreasing the energy footprint of the system.

In addition, in some embodiments, the position-only shading may be disabled. For example a draw call may indicate that position-only shading will not be used. This may save memory bandwidth, compute cycles and/or time. Thus the system may selectively disable and then enable position-only shading, for example on a draw call by draw call basis.

When position-only shading is disabled, the replay pipeline does not look for any bitwise information for that draw call and there is no visibility information for the entire draw call.

Culling techniques can improve performance in a graphics processor. Standard techniques include backface culling, view frustum culling, Z-max occlusion culling, and occlusion queries. In general, a culling technique reduces the amount of unnecessary work done to render an image, e.g., by discarding triangles that are fully outside the field of view (also called the view frustum in graphics). The earlier a culling test can be performed in a graphics pipeline, the better, because then the data can be discarded in the pipeline earlier, and the costs can be reduced. Zmax-occlusion culling may be performed earlier using a position-only shading (POS) pipeline.

A conservative depth representation is recorded per tile (which may represent a rectangular region of pixels in one embodiment) in the Cull Pipe. Then, for all triangles going through the cull pipe, one can test if a triangle is fully occluded with respect to the conservative depth representation. If the triangle is occluded, then it will be culled, and it will not survive until the replay pipe. This provides for power savings and/or a performance increase in some workloads.

In order to be able to do occlusion culling, the graphics processor needs to have some kind of occlusion representation. This information could be a depth per pixel, but to reduce storage costs, it can make more sense to have a coarser and conservative representation. One type of representation is to store a maximum depth (Zmax) and a minimum depth (Zmin) scalar value per tile. The Zmax is greater or equal to the largest depth in the tile, and Zmin is less than or equal to the smallest depth in the tile. Hence, if a triangle resides completely inside a single tile, for example, and if the triangle's depths are larger than the tile's Zmax, then that triangle is occluded by already rendered geometry, and therefore, the triangle can safely be culled. The Zmin is useful when the depth test is reversed (e.g., OpenGL depth functions: GREATER or GEQUAL). Each tile may have a depth representation, and one way to implement this depth representation is to use Zmin and Zmax as described above.

Figure 4:
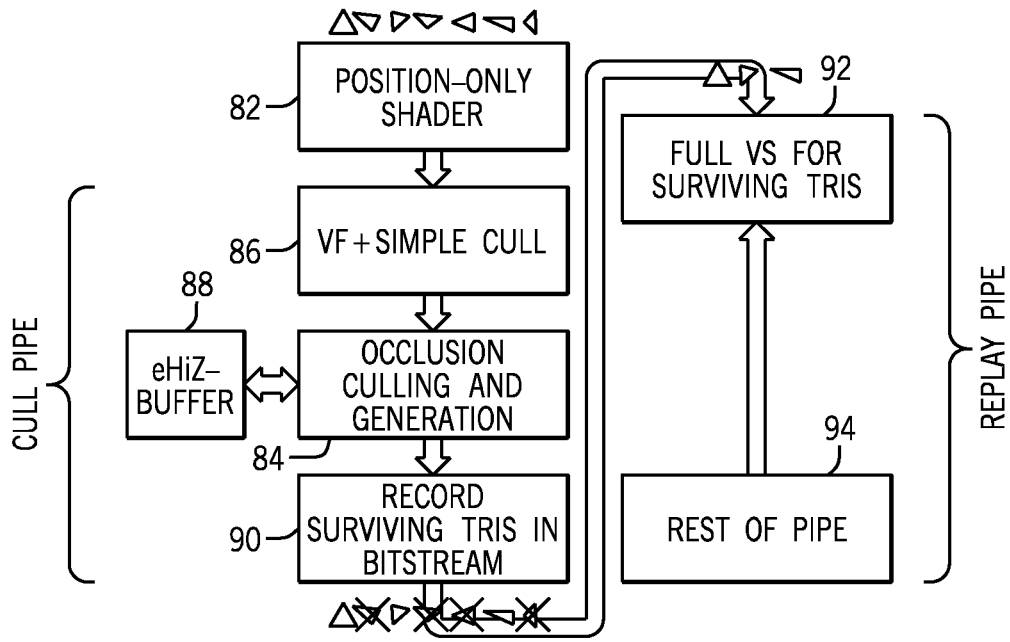
FIG. 4 is a flow chart for a cull pipe and replay pipe with occlusion culling according to one embodiment.

FIG. 4 is a modified POS pipeline 82 to also include occlusion culling 84. The simple cull (backface, degenerate and zero coverage) tests and view frustum culling 86 techniques are, in general, culling more triangles than occlusion culling, so the occlusion culling 84 is placed after the view frustum and simple culling tests 86. So, for surviving triangles (after view frustum culling and simple culling), a triangle occlusion test with respect to the depth representations of the tiles is done. If the triangle is occluded, it will not be processed in the Replay Pipe. If the triangle is not fully occluded, the triangle may generate occlusion information that can potentially update the depth representation of the tiles. Some of the input triangles (indicated by triangles over the position only shader 82) may be culled as indicated by Xs over the triangles below the block 90.

The occlusion algorithms may operate on a single tile at a time. The Cull Pipe may contain a coarse rasterizer that identifies all tiles overlapped by a triangle. Furthermore, the rasterizer may compute conservative bounds of the minimum and maximum depth values of the triangle inside each tile. These bounds are called $Z_{min}^{tri}$, $Z_{max}^{tri}$. Once a tile is identified as overlapping the triangle, it is passed on to one of the occlusion culling algorithms.

In this implementation a single $Z_{min}^{tile}$, $Z_{max}^{tile}$ pair is stored per tile. In some embodiments 8×8 pixel tiles give a good tradeoff between culling efficiency and bandwidth, but the tiles may be of any shape and size. The buffer containing the $Z_{min}^{tile}$, $Z_{max}^{tile}$ values for all tiles on screen is denoted the early HiZ buffer, or eHiZ buffer 88, to distinguish it from the standard HiZ buffer in modern graphics processors. The surviving triangles are stored bitwise as indicated at block 90. Then in the Replay Pipe the full vertex shader is run for the surviving triangles (block 92) followed by the rest of the pipe 94, i.e., the replay pipeline works as described earlier in this text.

An algorithm may be described relative to a LESS depth test, but it generalizes to any form of test. The algorithm begins by performing a standard conservative culling test between the triangle and the tiles in the eHiZ buffer, so that the triangle can be culled in a tile if $Z_{min}^{tri} > Z_{max}^{tile}$. Hence, the entire triangle can only be culled if all tiles overlapped by the triangle fulfill the test above (i.e. the triangle is behind the depth representation for all tiles overlapped by the triangle).

If the tile is not culled, the eHiZ buffer is conservatively updated. In this case, Zmin is updated as $Z_{min}^{tile} = \min(Z_{min}^{tile}, Z_{min}^{tri})$. The Zmax value may only be updated if the tile is fully covered. This can be determined using a conservative tile-triangle overlap test in the rasterizer, or by performing inside tests for all samples in the tile. If the tile is completely covered by the triangle, Zmax is updated as $Z_{max}^{tile} = \min(Z_{max}^{tile}, Z_{max}^{tri})$.

As an extension, the Zmin/Zmax representation may be reduced to a single reference value called Zcull. In this case, only the reference value needed to perform the culling test (Zmax in the LESS test example above) is maintained. If the depth test function changes polarity, for example from a LESS to a GREATER test, the Zcull value is lazily cleared to ensure that the test is always conservative. Therefore one bit per tile is stored indicating if a current Zcull value represents a Zmin or a Zmax value.

Another possible implementation of the occlusion culling algorithm is to use Zmax-mask representation. This representation may store not only one, but a set of $Z_{max}^{tile}$ values for each tile. A mask of index bits selects which of the $Z_{max}^{tile}$ values apply to each pixel or sample in the tile. A conservative depth test is performed, and if the incoming triangle in the tile cannot be culled, the $Z_{max}^{tri}$ and the $Z_{min}^{tri}$ values are used to update the masked depth representation. However, the masked representation is typically not beneficial for the min values, and they are therefore tied to a fixed screen space region rather than addressed by the index bit mask.

In practice, two $Z_{max}^{tile}$ values per tile usually gives the best trade-off between storage cost and culling efficiency. Keeping $Z_{min}^{tile}$ value per tile may be beneficial for some workloads, but a one-sided test is typically enough to capture most of the culling potential.

The mask of index bits is typically coherent, and may therefore be compressed in most cases to reduce the memory footprint for a tile. Any bit-mask compression algorithm may be used, but one algorithm stores each 4×2 or 2×4 region using a bit to indicate if the region is constant, and then either a single bit for constant regions, or eight bits if the region is not constant. If a tile is not compressible to the desired bit-budget, lossy compression may be used. In one implementation $Z_{max}^{tile}$ the values are always sorted, ensuring that $Z_{max0}^{tile} > Z_{max1}^{tile}$. It is therefore always safe to change a bit in the index mask from one to zero (effectively pushing that pixel or sample back, but still being conservative). If the desired bit budget can be met, the 4×2/2×4 region with the least number of set bits may be selected, and the entire region is cleared to zero. Then the flow continues with the region with second least set bits until the bit-budget is met.

Pixel shading continues to be one of the most expensive parts of the entire graphics pipeline, and reducing the pressure on the execution units (EUs) (sometimes called shader cores) is of vital importance, since it will increase performance and more importantly, reduce power usage as well.

In the cull pipe, a depth representation of the scene is recorded, and this depth representation is then used to prime the HiZ buffer of the replay pipeline. In this way, pixel shader work of some triangles may be culled using the depth of (other) triangles "from the future".

Figure 5:
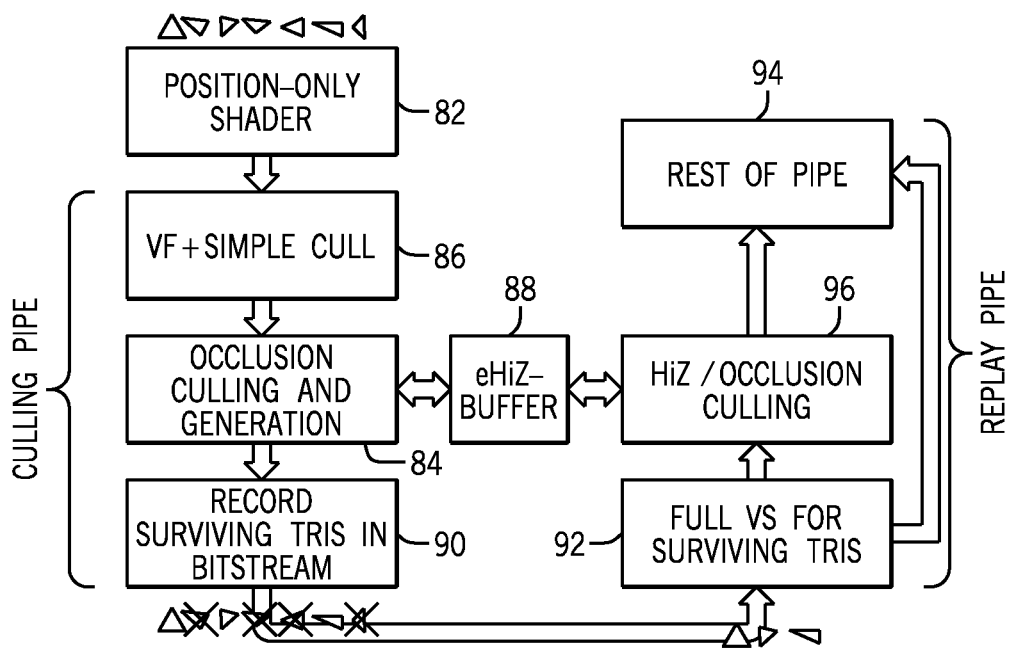
FIG. 5 is a flow chart for a replay pipe with a culling pipe that records a depth representation according to one embodiment.

A depth representation, called the early HiZ buffer or eHiZ 88, is recorded in the culling pipe as shown in FIG. 5. There are many different choices for this representation. The Cull Pipe first does the position-only shader, followed by the standard culling tests. For surviving triangles, a depth representation is generated, possibly sending updates to the eHiZ-buffer. In most graphics processors, there is a HiZ unit that quickly culls rasterized tiles based on depth. In this pipeline, the HiZ unit 96 is inside the Replay Pipe. Before the Replay Pipe starts processing the render commands, the HiZ buffer is primed using the depth representation in the eHiZ buffer 88. This information may be converted from the eHiZ format to the format of the HiZ, but ideally the units use a compatible format, eliminating the conversion step. After priming has occurred, all the non-culled triangles are processed without modification in the Replay Pipeline, and culling is done based on the already initiated information in HiZ.

The sequences of FIGS. 4 and 5 may be implemented in software, firmware and/or hardware. In software and firmware embodiments they may be implemented by computer executed instructions stored in one or more non-transitory computer readable media such as magnetic, optical or semiconductor storages.

Because the HiZ buffer is initialized with the eHiZ buffer (which has already been generated using the whole, or at least a part of, the upcoming render command stream for that render target) occluded regions are culled even in cases when the occluding geometry is submitted after the geometry it occludes. Thus, more pixel shader work can be avoided, improving overall performance in some embodiments.

Pixel shader instructions may be reduced and pixel shader culling may further reduce texture, depth buffer, and color buffer bandwidths due to culling in some embodiments.

As this pixel shader occlusion culling algorithm is an extension to occlusion culling, the same eHiZ data layout and culling algorithms may be used in some embodiments.

A full per-sample depth buffer representation may be maintained as the eHiZ buffer. A Zmax mask may give the best tradeoff between culling efficiency and bandwidth, but a per-sample depth algorithm may be used in some embodiments.

Per-sample depth is implemented by adding full depth buffer logic to the culling pipeline, where depth buffer values are updated on a per-sample basis. A crucial difference, however, is that the pixel shader is not executed in the pipeline, and therefore the depth value is not updated in the eHiZ buffer if non-promoted depth is used. Non-promoted depth is when the depth test cannot be done before the pixel shader is executed. This may be the case, for example, when the pixel shader computes the depth values per sample. This means that the value in the eHiZ buffer will actually be a bound, either $Z_{min}$ or $Z_{max}$, for that sample, and erroneously culling of non-visible geometry may be avoided. This is seen when an EQUAL depth test is used in combination with non-promoted depth.

As an example, assume that foliage is rendered in a first pass with a pixel shader discard. Since the pixel shader discards fragments, non-promoted depth and inability to update the eHiZ buffer may be predicted. However, if a subsequent pass renders lighting using an EQUAL test, an exact equal test cannot be performed because the eHiZ buffer was not updated in the preceding pass. If the eHiZ sample's depth value tracks $Z_{min}$ or $Z_{max}$ and defining a conservative EQUAL test as $z \leq Z_{max}$ or $z \geq Z_{min}$, depending on which value is stored in the eHiZ buffer the inability to do an exact equal test may be alleviated. Whether the samples' depth value tracks $Z_{min}$ or $z \geq Z_{max}$ depends on the direction of the depth function used to update it. For example, a LESS function means that the sample's depth will be representative of a $Z_{max}$ value.

Priming the HiZ buffer is only possible if the output (or result) of all submitted render commands is not affected. The most notable assumption, in some embodiments, that is made is that the values in the Z buffer must be either monotonically increasing or decreasing. Otherwise, the final state of the Z buffer is not representative for culling. Furthermore, we assume that there is no side effect of executing the pixel shader. This includes unordered access view (UAV) accesses, outputting depth from the pixel shader, pixel shader discards, and stencil operations. Below is a list of conditions and how they are handled in one implementation.

1. Depth Test Flip:

If the depth function is reversed (LESS→GREATER or GREATER→LESS) the HiZ buffer is not primed in one embodiment. This is only true if the flipped depth test actually has depth writes enabled.

2. Pixel Shader Discard/Alpha Testing:

In these cases, the eHiZ buffer is not updated, because complete evaluation of the coverage/depth in the culling pipeline is not feasible. However, one may cull against existing geometry, and if a two sided eHiZ format is used we may conservatively update the bounds. For example, if a LESS test is used $Z_{min}$ but not $Z_{max}$ may be updated.

3. Alpha Blending:

If alpha blending is enabled, the eHiZ buffer is not updated, as priming may erroneously cull geometry included in the alpha blending operation. However, alpha blended geometry may be culled against the contents of the eHiZ buffer.

4. Pixel Shader Writes Depth:

If conservative depth output is used the eHiZ buffer is updated or culling may be performed for the primitive (depending on if the conservative depth has the same "direction" as the depth function or not). In the general case, however, neither culling, nor updating of the eHiZ buffer may be performed.

5. Multiple Clears:

Multiple clears or Z buffer re-use may be handled either by disabling priming, or by forcing the replay pipeline to execute the commands issued between each clear before the buffer is cleared. Pipeline stalling related to this solution may be worked around by creating virtual copies of the Z buffer.

6. Buffer Switching:

If the color buffers, or any other output buffers, are swapped without clearing the depth buffer, all commands in the Replay Pipeline may be executed before continuing, or alternatively priming may be disabled.

7. Pixel Shader UAV:

If any pixel shader writes to an UAV, priming is not used, as this might erroneously cull UAV writes.

Figure 6:
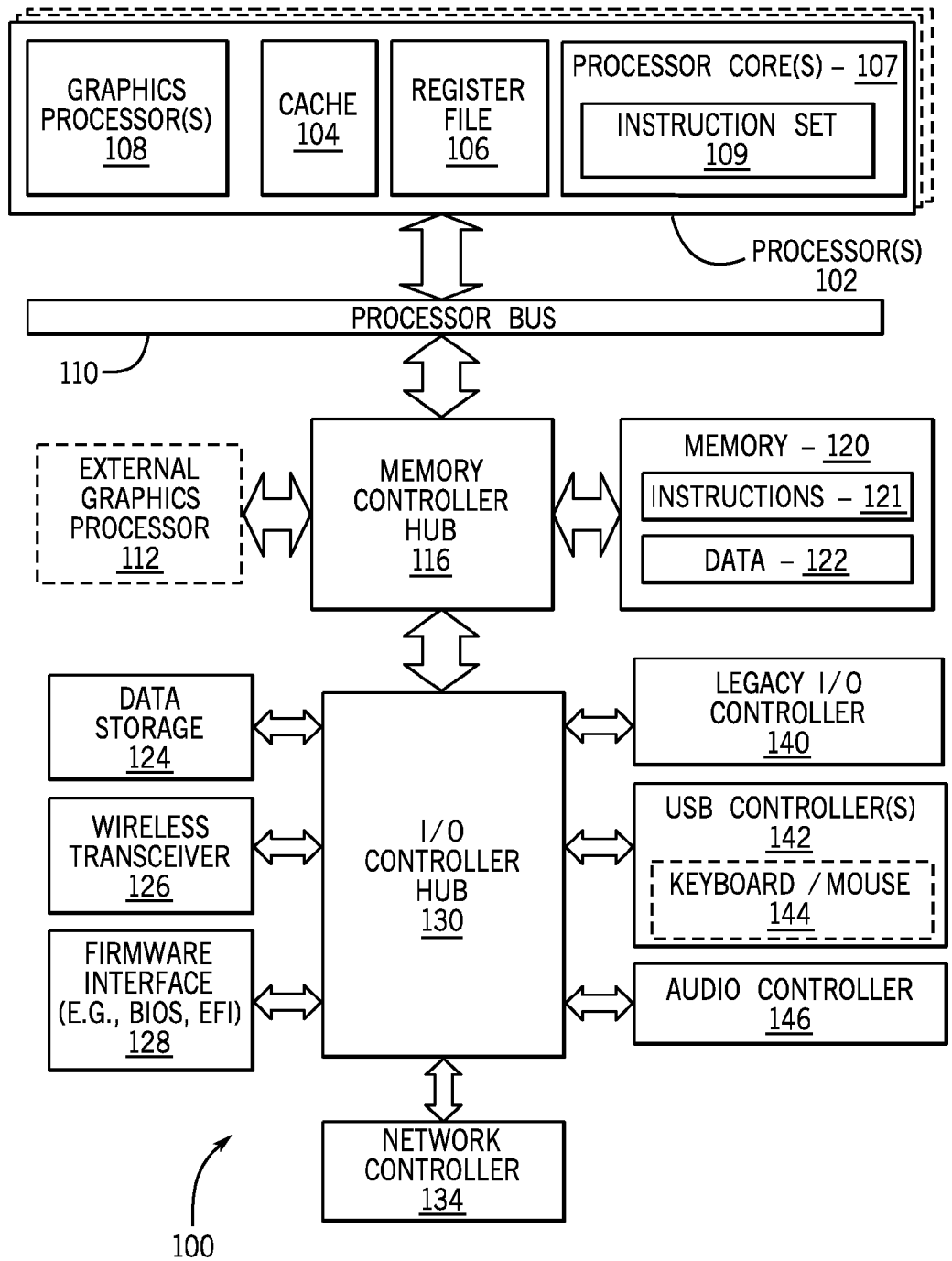
FIG. 6 is a block diagram of a data processing system according to one embodiment.

FIG. 6 is a block diagram of a data processing system 100, according to an embodiment. The data processing system 100 includes one or more processors 102 and one or more graphics processors 108, and may be a single processor desktop system, a multiprocessor workstation system, or a server system having a large number of processors 102 or processor cores 107. In on embodiment, the data processing system 100 is a system on a chip integrated circuit (SOC) for use in mobile, handheld, or embedded devices.

An embodiment of the data processing system 100 can include, or be incorporated within a server-based gaming platform, a game console, including a game and media console, a mobile gaming console, a handheld game console, or an online game console. In one embodiment, the data processing system 100 is a mobile phone, smart phone, tablet computing device or mobile Internet device. The data processing system 100 can also include, couple with, or be integrated within a wearable device, such as a smart watch wearable device, smart eyewear device, augmented reality device, or virtual reality device. In one embodiment, the data processing system 100 is a television or set top box device having one or more processors 102 and a graphical interface generated by one or more graphics processors 108.

The one or more processors 102 each include one or more processor cores 107 to process instructions which, when executed, perform operations for system and user software. In one embodiment, each of the one or more processor cores 107 is configured to process a specific instruction set 109. The instruction set 109 may facilitate complex instruction set computing (CISC), reduced instruction set computing (RISC), or computing via a very long instruction word (VLIW). Multiple processor cores 107 may each process a different instruction set 109 which may include instructions to facilitate the emulation of other instruction sets. A processor core 107 may also include other processing devices, such a digital signal processor (DSP).

In one embodiment, the processor 102 includes cache memory 104. Depending on the architecture, the processor 102 can have a single internal cache or multiple levels of internal cache. In one embodiment, the cache memory is shared among various components of the processor 102. In one embodiment, the processor 102 also uses an external cache (e.g., a Level 3 (L3) cache or last level cache (LLC)) (not shown) which may be shared among the processor cores 107 using known cache coherency techniques. A register file 106 is additionally included in the processor 102 which may include different types of registers for storing different types of data (e.g., integer registers, floating point registers, status registers, and an instruction pointer register). Some registers may be general-purpose registers, while other registers may be specific to the design of the processor 102.

The processor 102 is coupled to a processor bus 110 to transmit data signals between the processor 102 and other components in the system 100. The system 100 uses an exemplary 'hub' system architecture, including a memory controller hub 116 and an input output (I/O) controller hub 130. The memory controller hub 116 facilitates communication between a memory device and other components of the system 100, while the I/O controller hub (ICH) 130 provides connections to I/O devices via a local I/O bus.

The memory device 120, can be a dynamic random access memory (DRAM) device, a static random access memory (SRAM) device, flash memory device, or some other memory device having suitable performance to serve as process memory. The memory 120 can store data 122 and instructions 121 for use when the processor 102 executes a process. The memory controller hub 116 also couples with an optional external graphics processor 112, which may communicate with the one or more graphics processors 108 in the processors 102 to perform graphics and media operations.

The ICH 130 enables peripherals to connect to the memory 120 and processor 102 via a high-speed I/O bus. The I/O peripherals include an audio controller 146, a firmware interface 128, a wireless transceiver 126 (e.g., Wi-Fi, Bluetooth), a data storage device 124 (e.g., hard disk drive, flash memory, etc.), and a legacy I/O controller for coupling legacy (e.g., Personal System 2 (PS/2)) devices to the system. One or more Universal Serial Bus (USB) controllers 142 connect input devices, such as keyboard and mouse 144 combinations. A network controller 134 may also couple to the ICH 130. In one embodiment, a high-performance network controller (not shown) couples to the processor bus 110.

Figure 7:
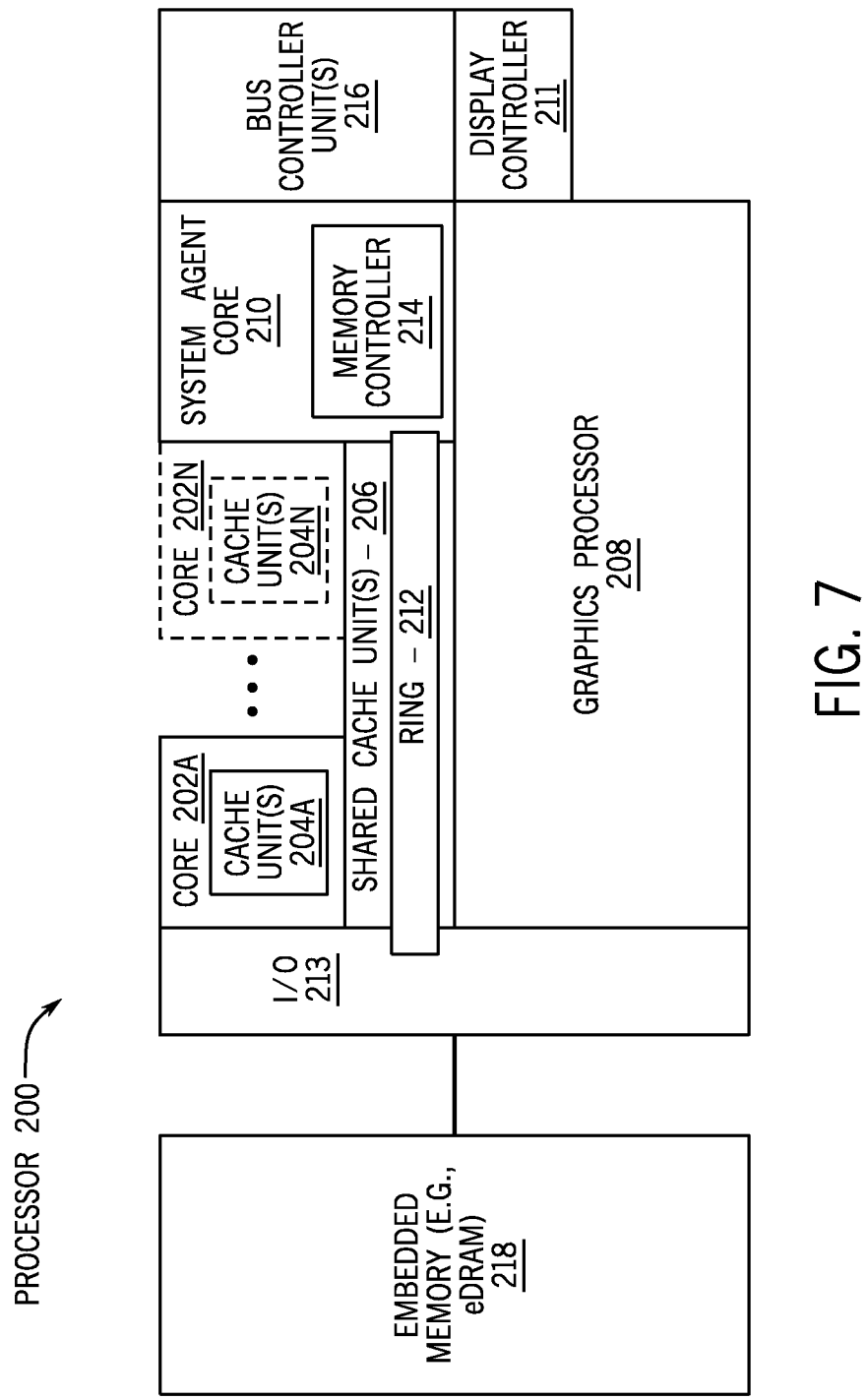
FIG. 7 is a block diagram of the processor shown in FIG. 6 according to one embodiment.

FIG. 7 is a block diagram of an embodiment of a processor 200 having one or more processor cores 202A-N, an integrated memory controller 214, and an integrated graphics processor 208. The processor 200 can include additional cores up to and including additional core 202N represented by the dashed lined boxes. Each of the cores 202A-N includes one or more internal cache units 204A-N. In one embodiment each core also has access to one or more shared cached units 206.

The internal cache units 204A-N and shared cache units 206 represent a cache memory hierarchy within the processor 200. The cache memory hierarchy may include at least one level of instruction and data cache within each core and one or more levels of shared mid-level cache, such as a level 2 (L2), level 3 (L3), level 4 (L4), or other levels of cache, where the highest level of cache before external memory is classified as the last level cache (LLC). In one embodiment, cache coherency logic maintains coherency between the various cache units 206 and 204A-N.

The processor 200 may also include a set of one or more bus controller units 216 and a system agent 210. The one or more bus controller units manage a set of peripheral buses, such as one or more Peripheral Component Interconnect buses (e.g., PCI, PCI Express). The system agent 210 provides management functionality for the various processor components. In one embodiment, the system agent 210 includes one or more integrated memory controllers 214 to manage access to various external memory devices (not shown).

In one embodiment, one or more of the cores 202A-N include support for simultaneous multi-threading. In such embodiment, the system agent 210 includes components for coordinating and operating cores 202A-N during multi-threaded processing. The system agent 210 may additionally include a power control unit (PCU), which includes logic and components to regulate the power state of the cores 202A-N and the graphics processor 208.

The processor 200 additionally includes a graphics processor 208 to execute graphics processing operations. In one embodiment, the graphics processor 208 couples with the set of shared cache units 206, and the system agent unit 210, including the one or more integrated memory controllers 214. In one embodiment, a display controller 211 is coupled with the graphics processor 208 to drive graphics processor output to one or more coupled displays. The display controller 211 may be separate module coupled with the graphics processor via at least one interconnect, or may be integrated within the graphics processor 208 or system agent 210.

In one embodiment a ring based interconnect unit 212 is used to couple the internal components of the processor 200, however an alternative interconnect unit may be used, such as a point to point interconnect, a switched interconnect, or other techniques, including techniques well known in the art. In one embodiment, the graphics processor 208 couples with the ring interconnect 212 via an I/O link 213.

The exemplary I/O link 213 represents at least one of multiple varieties of I/O interconnects, including an on package I/O interconnect which facilitates communication between various processor components and a high-performance embedded memory module 218, such as an eDRAM module. In one embodiment each of the cores 202-N and the graphics processor 208 use the embedded memory modules 218 as shared last level cache.

In one embodiment cores 202A-N are homogenous cores executing the same instruction set architecture. In another embodiment, the cores 202A-N are heterogeneous in terms of instruction set architecture (ISA), where one or more of the cores 202A-N execute a first instruction set, while at least one of the other cores executes a subset of the first instruction set or a different instruction set.

The processor 200 can be a part of or implemented on one or more substrates using any of a number of process technologies, for example, Complementary metal-oxide-semiconductor (CMOS), Bipolar Junction/Complementary metal-oxide-semiconductor (BiCMOS) or N-type metal-oxide-semiconductor logic (NMOS). Additionally, the processor 200 can be implemented on one or more chips or as a system on a chip (SOC) integrated circuit having the illustrated components, in addition to other components.

Figure 8:
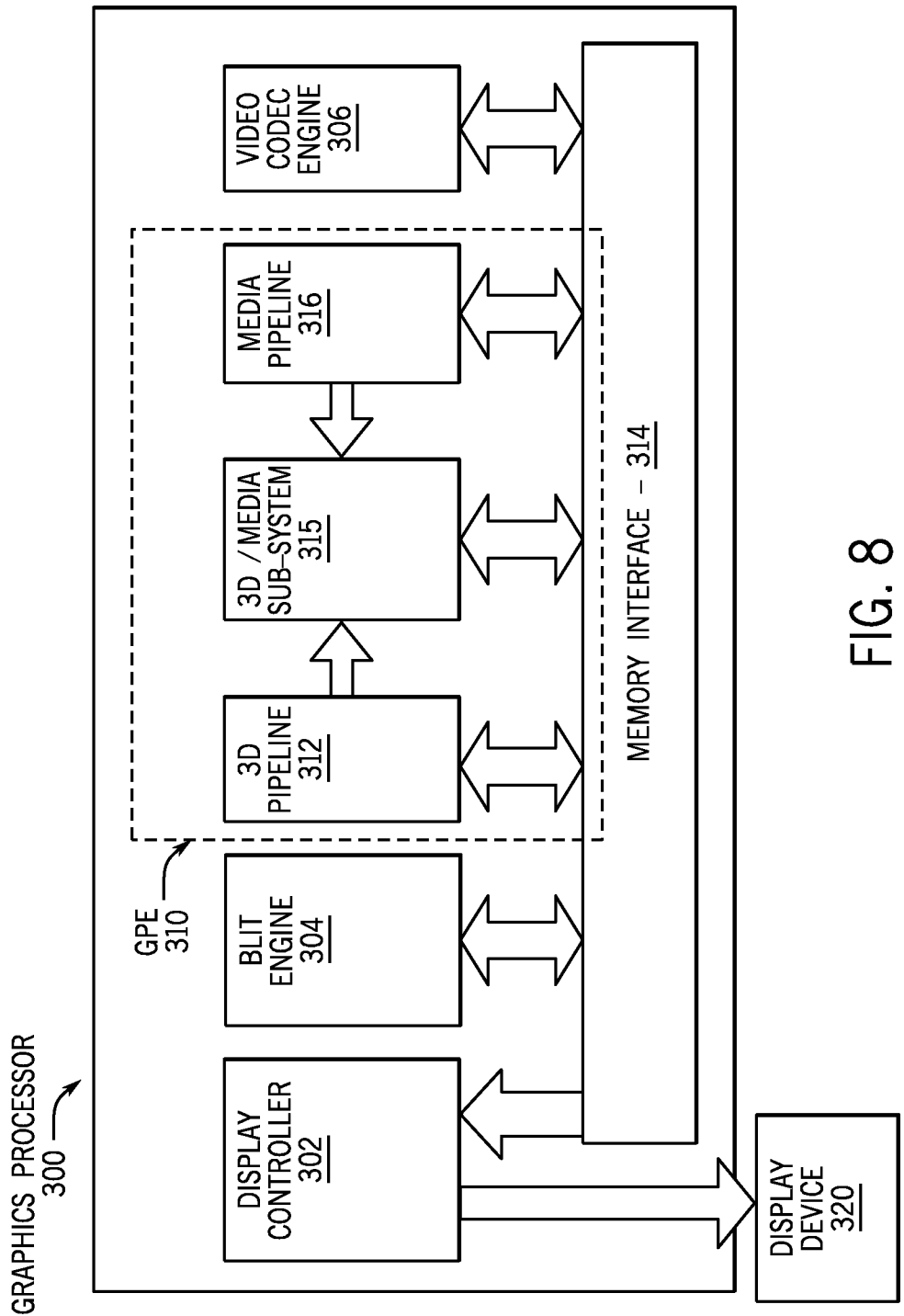
FIG. 8 is a block diagram of the graphics processor of FIG. 6 according to one embodiment.

FIG. 8 is a block diagram of one embodiment of a graphics processor 300 which may be a discreet graphics processing unit, or may be graphics processor integrated with a plurality of processing cores. In one embodiment, the graphics processor is communicated with via a memory mapped I/O interface to registers on the graphics processor and via commands placed into the processor memory. The graphics processor 300 includes a memory interface 314 to access memory. The memory interface 314 can be an interface to local memory, one or more internal caches, one or more shared external caches, and/or to system memory.

The graphics processor 300 also includes a display controller 302 to drive display output data to a display device 320. The display controller 302 includes hardware for one or more overlay planes for the display and composition of multiple layers of video or user interface elements. In one embodiment the graphics processor 300 includes a video codec engine 306 to encode, decode, or transcode media to, from, or between one or more media encoding formats, including, but not limited to Moving Picture Experts Group (MPEG) formats such as MPEG-2, Advanced Video Coding (AVC) formats such as H.264/MPEG-4 AVC, as well as the Society of Motion Picture & Television Engineers (SMPTE) 421 M/VC-1, and Joint Photographic Experts Group (JPEG) formats such as JPEG, and Motion JPEG (MJPEG) formats.

In one embodiment, the graphics processor 300 includes a block image transfer (BLIT) engine 304 to perform two-dimensional (2D) rasterizer operations including, for example, bit-boundary block transfers. However, in one embodiment, 2D graphics operations are performed using one or more components of the graphics-processing engine (GPE) 310. The graphics-processing engine 310 is a compute engine for performing graphics operations, including three-dimensional (3D) graphics operations and media operations.

The GPE 310 includes a 3D pipeline 312 for performing 3D operations, such as rendering three-dimensional images and scenes using processing functions that act upon 3D primitive shapes (e.g., rectangle, triangle, etc.). The 3D pipeline 312 includes programmable and fixed function elements that perform various tasks within the element and/or spawn execution threads to a 3D/Media sub-system 315. While the 3D pipeline 312 can be used to perform media operations, an embodiment of the GPE 310 also includes a media pipeline 316 that is specifically used to perform media operations, such as video post processing and image enhancement.

In one embodiment, the media pipeline 316 includes fixed function or programmable logic units to perform one or more specialized media operations, such as video decode acceleration, video de-interlacing, and video encode acceleration in place of, or on behalf of the video codec engine 306. In on embodiment, the media pipeline 316 additionally includes a thread spawning unit to spawn threads for execution on the 3D/Media sub-system 315. The spawned threads perform computations for the media operations on one or more graphics execution units included in the 3D/Media sub-system.

The 3D/Media subsystem 315 includes logic for executing threads spawned by the 3D pipeline 312 and media pipeline 316. In one embodiment, the pipelines send thread execution requests to the 3D/Media subsystem 315, which includes thread dispatch logic for arbitrating and dispatching the various requests to available thread execution resources. The execution resources include an array of graphics execution units to process the 3D and media threads. In one embodiment, the 3D/Media subsystem 315 includes one or more internal caches for thread instructions and data. In one embodiment, the subsystem also includes shared memory, including registers and addressable memory, to share data between threads and to store output data.

Figure 9:
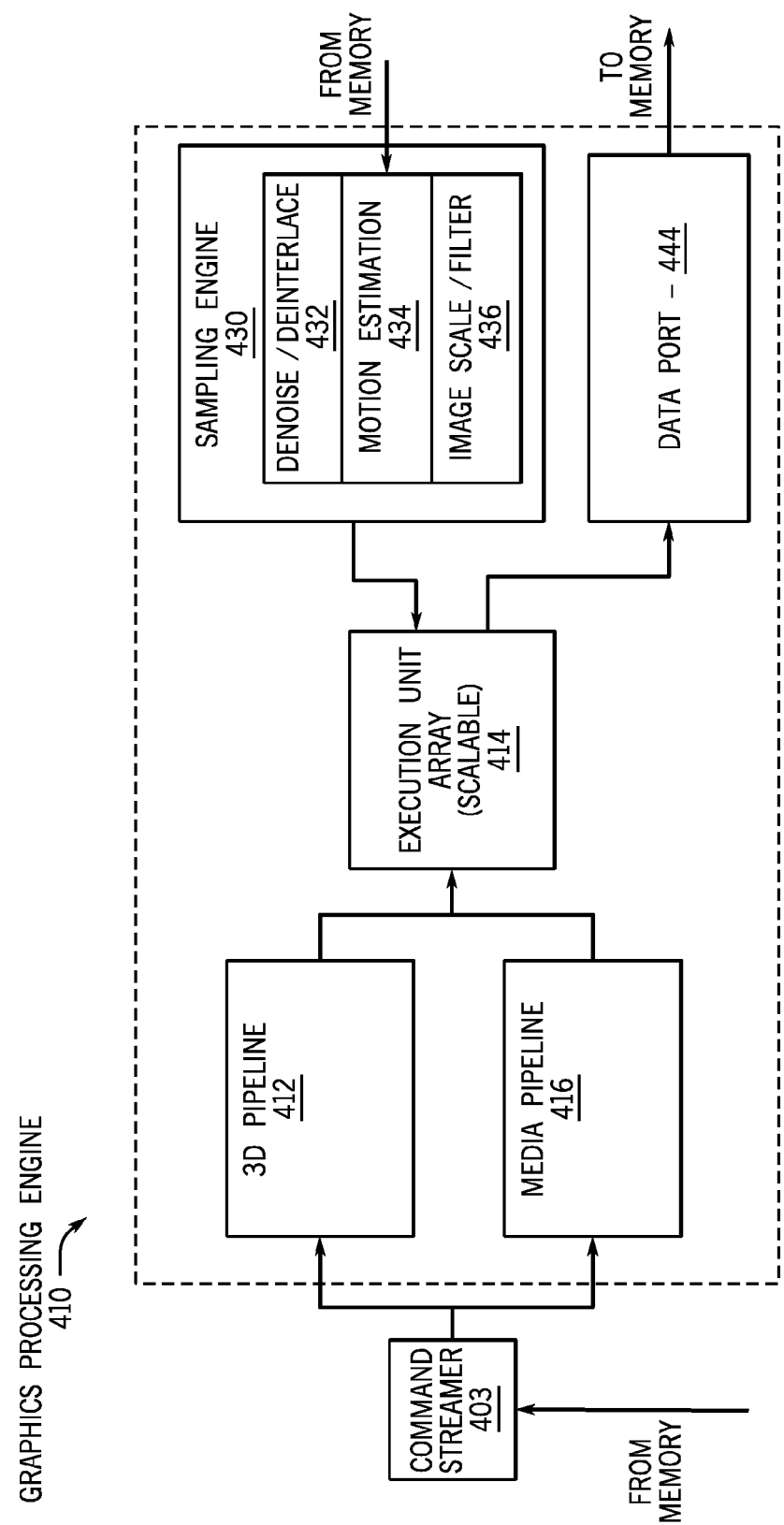
FIG. 9 is a block diagram of a graphics processing engine according to one embodiment.

FIG. 9 is a block diagram of an embodiment of a graphics processing engine 410 for a graphics processor. In one embodiment, the graphics processing engine (GPE) 410 is a version of the GPE 310 shown in FIG. 8. The GPE 410 includes a 3D pipeline 412 and a media pipeline 416, each of which can be either different from or similar to the implementations of the 3D pipeline 312 and the media pipeline 316 of FIG. 8.

In one embodiment, the GPE 410 couples with a command streamer 403, which provides a command stream to the GPE 3D and media pipelines 412, 416. The command streamer 403 is coupled to memory, which can be system memory, or one or more of internal cache memory and shared cache memory. The command streamer 403 receives commands from the memory and sends the commands to the 3D pipeline 412 and/or media pipeline 416. The 3D and media pipelines process the commands by performing operations via logic within the respective pipelines or by dispatching one or more execution threads to the execution unit array 414. In one embodiment, the execution unit array 414 is scalable, such that the array includes a variable number of execution units based on the target power and performance level of the GPE 410.

A sampling engine 430 couples with memory (e.g., cache memory or system memory) and the execution unit array 414. In one embodiment, the sampling engine 430 provides a memory access mechanism for the scalable execution unit array 414 that allows the execution array 414 to read graphics and media data from memory. In one embodiment, the sampling engine 430 includes logic to perform specialized image sampling operations for media.

The specialized media sampling logic in the sampling engine 430 includes a de-noise/de-interlace module 432, a motion estimation module 434, and an image scaling and filtering module 436. The de-noise/de-interlace module 432 includes logic to perform one or more of a de-noise or a de-interlace algorithm on decoded video data. The de-interlace logic combines alternating fields of interlaced video content into a single fame of video. The de-noise logic reduces or remove data noise from video and image data. In one embodiment, the de-noise logic and de-interlace logic are motion adaptive and use spatial or temporal filtering based on the amount of motion detected in the video data. In one embodiment, the de-noise/de-interlace module 432 includes dedicated motion detection logic (e.g., within the motion estimation engine 434).

The motion estimation engine 434 provides hardware acceleration for video operations by performing video acceleration functions such as motion vector estimation and prediction on video data. The motion estimation engine determines motion vectors that describe the transformation of image data between successive video frames. In one embodiment, a graphics processor media codec uses the video motion estimation engine 434 to perform operations on video at the macro-block level that may otherwise be computationally intensive to perform using a general-purpose processor. In one embodiment, the motion estimation engine 434 is generally available to graphics processor components to assist with video decode and processing functions that are sensitive or adaptive to the direction or magnitude of the motion within video data.

The image scaling and filtering module 436 performs image-processing operations to enhance the visual quality of generated images and video. In one embodiment, the scaling and filtering module 436 processes image and video data during the sampling operation before providing the data to the execution unit array 414.

In one embodiment, the graphics processing engine 410 includes a data port 444, which provides an additional mechanism for graphics subsystems to access memory. The data port 444 facilitates memory access for operations including render target writes, constant buffer reads, scratch memory space reads/writes, and media surface accesses. In one embodiment, the data port 444 includes cache memory space to cache accesses to memory. The cache memory can be a single data cache or separated into multiple caches for the multiple subsystems that access memory via the data port (e.g., a render buffer cache, a constant buffer cache, etc.). In one embodiment, threads executing on an execution unit in the execution unit array 414 communicate with the data port by exchanging messages via a data distribution interconnect that couples each of the sub-systems of the graphics processing engine 410.

Figure 10:
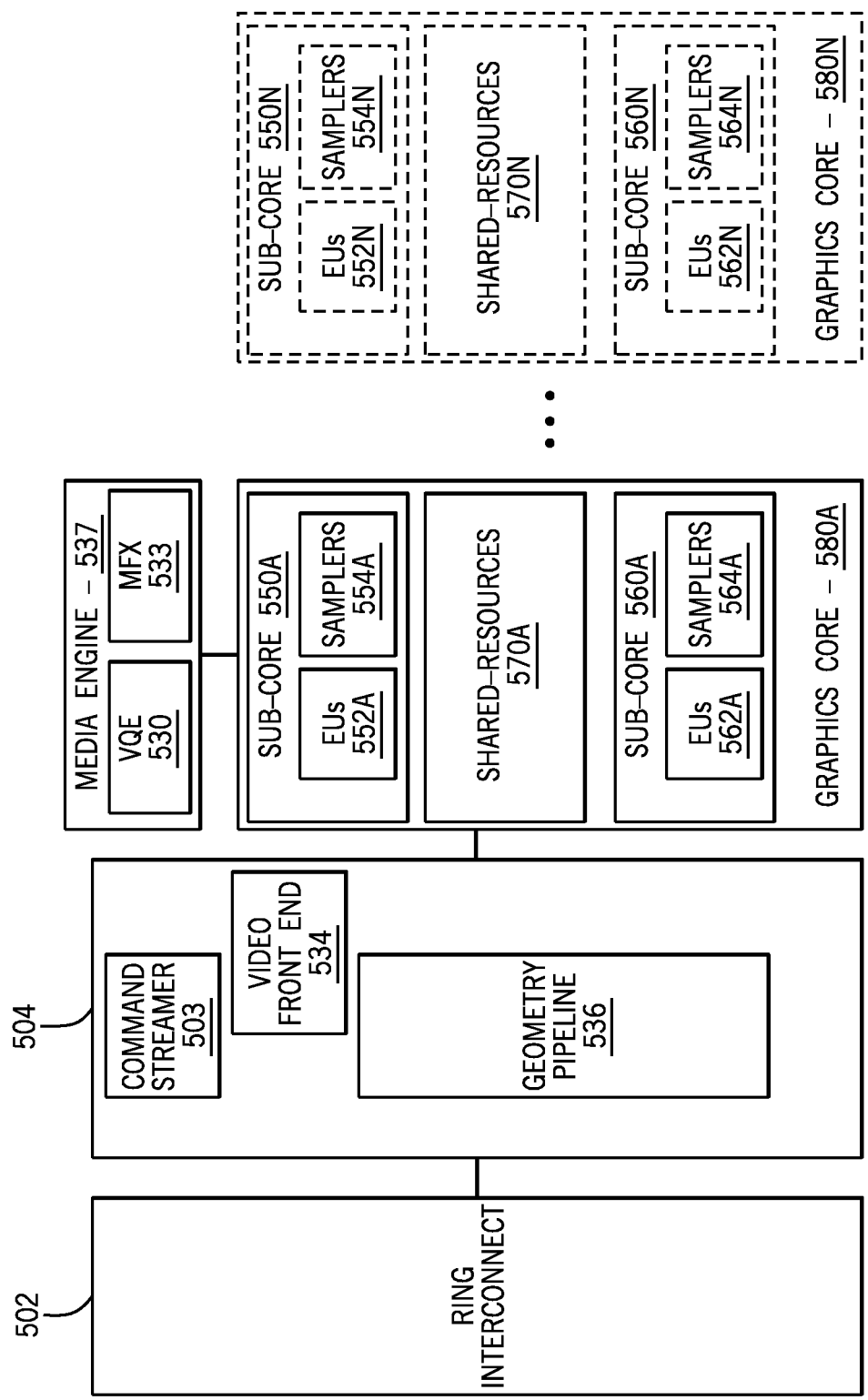
FIG. 10 is a block diagram of a graphics processor according to another embodiment.

FIG. 10 is a block diagram of another embodiment of a graphics processor. In one embodiment, the graphics processor includes a ring interconnect 502, a pipeline front-end 504, a media engine 537, and graphics cores 580A-N. The ring interconnect 502 couples the graphics processor to other processing units, including other graphics processors or one or more general-purpose processor cores. In one embodiment, the graphics processor is one of many processors integrated within a multi-core processing system.

The graphics processor receives batches of commands via the ring interconnect 502. The incoming commands are interpreted by a command streamer 503 in the pipeline front-end 504. The graphics processor includes scalable execution logic to perform 3D geometry processing and media processing via the graphics core(s) 580A-N. For 3D geometry processing commands, the command streamer 503 supplies the commands to the geometry pipeline 536. For at least some media processing commands, the command streamer 503 supplies the commands to a video front end 534, which couples with a media engine 537. The media engine 537 includes a video quality engine (VQE) 530 for video and image post processing and a multi-format encode/decode (MFX) 533 engine to provide hardware-accelerated media data encode and decode. The geometry pipeline 536 and media engine 537 each generate execution threads for the thread execution resources provided by at least one graphics core 580A.

The graphics processor includes scalable thread execution resources featuring modular cores 580A-N (sometime referred to as core slices), each having multiple sub-cores 550A-N, 560A-N (sometimes referred to as core sub-slices). The graphics processor can have any number of graphics cores 580A through 580N. In one embodiment, the graphics processor includes a graphics core 580A having at least a first sub-core 550A and a second core sub-core 560A. In another embodiment, the graphics processor is a low power processor with a single sub-core (e.g., 550A). In one embodiment, the graphics processor includes multiple graphics cores 580A-N, each including a set of first sub-cores 550A-N and a set of second sub-cores 560A-N. Each sub-core in the set of first sub-cores 550A-N includes at least a first set of execution units 552A-N and media/texture samplers 554A-N. Each sub-core in the set of second sub-cores 560A-N includes at least a second set of execution units 562A-N and samplers 564A-N. In one embodiment, each sub-core 550A-N, 560A-N shares a set of shared resources 570A-N. In one embodiment, the shared resources include shared cache memory and pixel operation logic. Other shared resources may also be included in the various embodiments of the graphics processor.

Figure 11:
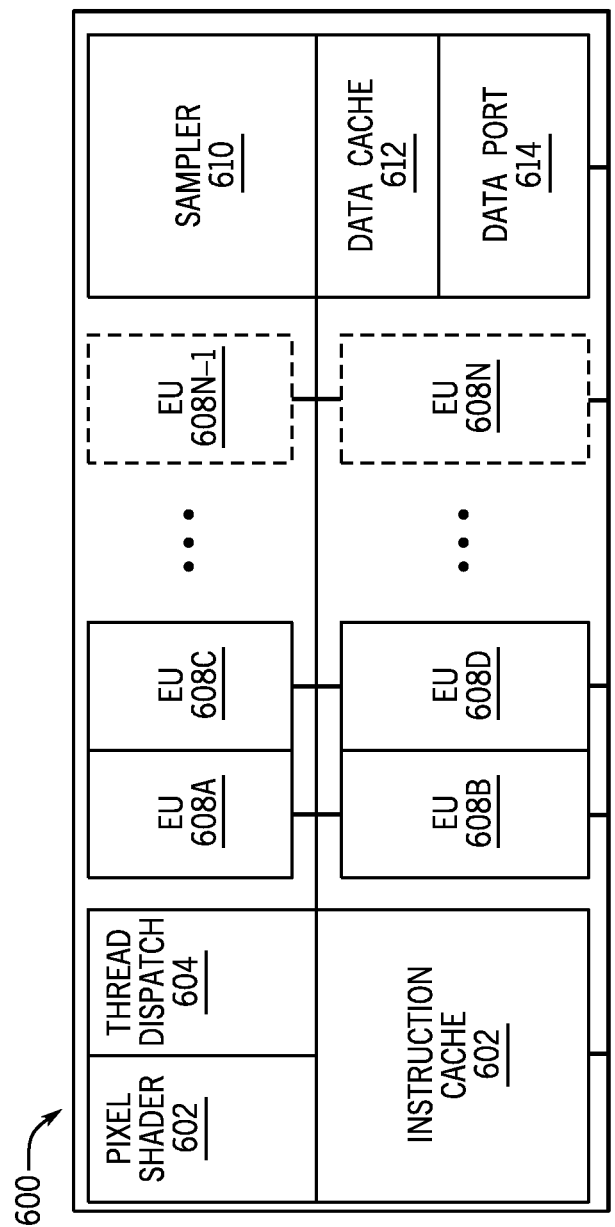
FIG. 11 illustrates thread execution logic for one embodiment.

FIG. 11 illustrates thread execution logic 600 including an array of processing elements employed in one embodiment of a graphics processing engine. In one embodiment, the thread execution logic 600 includes a pixel shader 602, a thread dispatcher 604, instruction cache 606, a scalable execution unit array including a plurality of execution units 608A-N, a sampler 610, a data cache 612, and a data port 614. In one embodiment the included components are interconnected via an interconnect fabric that links to each of the components. The thread execution logic 600 includes one or more connections to memory, such as system memory or cache memory, through one or more of the instruction cache 606, the data port 614, the sampler 610, and the execution unit array 608A-N. In one embodiment, each execution unit (e.g. 608A) is an individual vector processor capable of executing multiple simultaneous threads and processing multiple data elements in parallel for each thread. The execution unit array 608A-N includes any number individual execution units.

In one embodiment, the execution unit array 608A-N is primarily used to execute "shader" programs. In one embodiment, the execution units in the array 608A-N execute an instruction set that includes native support for many standard 3D graphics shader instructions, such that shader programs from graphics libraries (e.g., Direct 3D and OpenGL) are executed with a minimal translation. The execution units support vertex and geometry processing (e.g., vertex programs, geometry programs, vertex shaders), pixel processing (e.g., pixel shaders, fragment shaders) and general-purpose processing (e.g., compute and media shaders).

Each execution unit in the execution unit array 608A-N operates on arrays of data elements. The number of data elements is the "execution size," or the number of channels for the instruction. An execution channel is a logical unit of execution for data element access, masking, and flow control within instructions. The number of channels may be independent of the number of physical ALUs or FPUs for a particular graphics processor. The execution units 608A-N support integer and floating-point data types.

The execution unit instruction set includes single instruction multiple data (SIMD) instructions. The various data elements can be stored as a packed data type in a register and the execution unit will process the various elements based on the data size of the elements. For example, when operating on a 256-bit wide vector, the 256 bits of the vector are stored in a register and the execution unit operates on the vector as four separate 64-bit packed data elements (quad-word (QW) size data elements), eight separate 32-bit packed data elements (double word (DW) size data elements), sixteen separate 16-bit packed data elements (word (W) size data elements), or thirty-two separate 8-bit data elements (byte (B) size data elements). However, different vector widths and register sizes are possible.

One or more internal instruction caches (e.g., 606) are included in the thread execution logic 600 to cache thread instructions for the execution units. In one embodiment, one or more data caches (e.g., 612) are included to cache thread data during thread execution. A sampler 610 is included to provide texture sampling for 3D operations and media sampling for media operations. In one embodiment, the sampler 610 includes specialized texture or media sampling functionality to process texture or media data during the sampling process before providing the sampled data to an execution unit.

During execution, the graphics and media pipelines send thread initiation requests to the thread execution logic 600 via thread spawning and dispatch logic. The thread execution logic 600 includes a local thread dispatcher 604 that arbitrates thread initiation requests from the graphics and media pipelines and instantiates the requested threads on one or more execution units 608A-N. For example, the geometry pipeline (e.g., 536 of FIG. 6) dispatches vertex processing, tessellation, or geometry processing threads to the thread execution logic 600. The thread dispatcher 604 can also process runtime thread spawning requests from the executing shader programs.

Once a group of geometric objects have been processed and rasterized into pixel data, the pixel shader 602 is invoked to further compute output information and cause results to be written to output surfaces (e.g., color buffers, depth buffers, stencil buffers, etc.). In one embodiment, the pixel shader 602 calculates the values of the various vertex attributes that are to be interpolated across the rasterized object. The pixel shader 602 then executes an API-supplied pixel shader program. To execute the pixel shader program, the pixel shader 602 dispatches threads to an execution unit (e.g., 608A) via the thread dispatcher 604. The pixel shader 602 uses texture sampling logic in the sampler 610 to access texture data in texture maps stored in memory. Arithmetic operations on the texture data and the input geometry data compute pixel color data for each geometric fragment, or discards one or more pixels from further processing.

In one embodiment, the data port 614 provides a memory access mechanism for the thread execution logic 600 output processed data to memory for processing on a graphics processor output pipeline. In one embodiment, the data port 614 includes or couples to one or more cache memories (e.g., data cache 612) to cache data for memory access via the data port.

Figure 12:
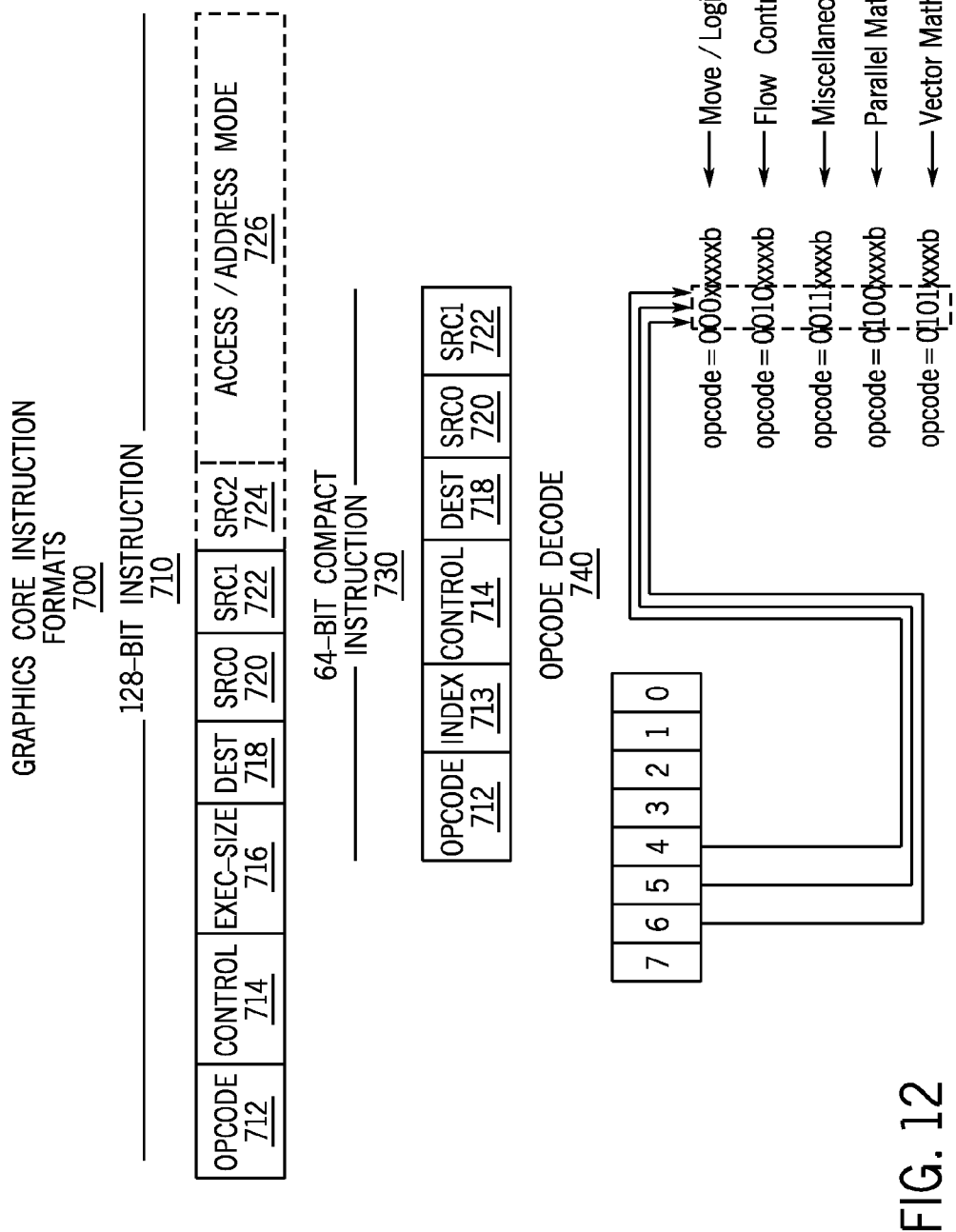
FIG. 12 is a block diagram of a graphics processor execution unit instruction format according to one embodiment.

FIG. 12 is a block diagram illustrating a graphics processor execution unit instruction format according to an embodiment. In one embodiment, the graphics processor execution units support an instruction set having instructions in multiple formats. The solid lined boxes illustrate the components that are generally included in an execution unit instruction, while the dashed lines include components that are optional or that are only included in a sub-set of the instructions. The instruction format described an illustrated are macro-instructions, in that they are instructions supplied to the execution unit, as opposed to micro-operations resulting from instruction decode once the instruction is processed.

In one embodiment, the graphics processor execution units natively support instructions in a 128-bit format 710. A 64-bit compacted instruction format 730 is available for some instructions based on the selected instruction, instruction options, and number of operands. The native 128-bit format 710 provides access to all instruction options, while some options and operations are restricted in the 64-bit format 730. The native instructions available in the 64-bit format 730 varies by embodiment. In one embodiment, the instruction is compacted in part using a set of index values in an index field 713. The execution unit hardware references a set of compaction tables based on the index values and uses the compaction table outputs to reconstruct a native instruction in the 128-bit format 710.

For each format, an instruction opcode 712 defines the operation that the execution unit is to perform. The execution units execute each instruction in parallel across the multiple data elements of each operand. For example, in response to an add instruction the execution unit performs a simultaneous add operation across each color channel representing a texture element or picture element. By default, the execution unit performs each instruction across all data channels of the operands. An instruction control field 712 enables control over certain execution options, such as channels selection (e.g., predication) and data channel order (e.g., swizzle). For 128-bit instructions 710 an exec-size field 716 limits the number of data channels that will be executed in parallel. The exec-size field 716 is not available for use in the 64-bit compact instruction format 730.

Some execution unit instructions have up to three operands including two source operands, src0 720, src1 722, and one destination 718. In one embodiment, the execution units support dual destination instructions, where one of the destinations is implied. Data manipulation instructions can have a third source operand (e.g., SRC2 724), where the instruction opcode JJ12 determines the number of source operands. An instruction's last source operand can be an immediate (e.g., hard-coded) value passed with the instruction.

In one embodiment instructions are grouped based on opcode bit-fields to simplify Opcode decode 740. For an 8-bit opcode, bits 4, 5, and 6 allow the execution unit to determine the type of opcode. The precise opcode grouping shown is exemplary. In one embodiment, a move and logic opcode group 742 includes data movement and logic instructions (e.g., mov, cmp). The move and logic group 742 shares the five most significant bits (MSB), where move instructions are in the form of 0000xxxxb (e.g., 0x0x) and logic instructions are in the form of 0001xxxxb (e.g., 0x01). A flow control instruction group 744 (e.g., call, jmp) includes instructions in the form of 0010xxxxb (e.g., 0x20). A miscellaneous instruction group 746 includes a mix of instructions, including synchronization instructions (e.g., wait, send) in the form of 0011xxxxb (e.g., 0x30). A parallel math instruction group 748 includes component-wise arithmetic instructions (e.g., add, mul) in the form of 0100xxxxb (e.g., 0x40). The parallel math group 748 performs the arithmetic operations in parallel across data channels. The vector math group 750 includes arithmetic instructions (e.g., dp4) in the form of 0101xxxxb (e.g., 0x50). The vector math group performs arithmetic such as dot product calculations on vector operands.

Figure 13:
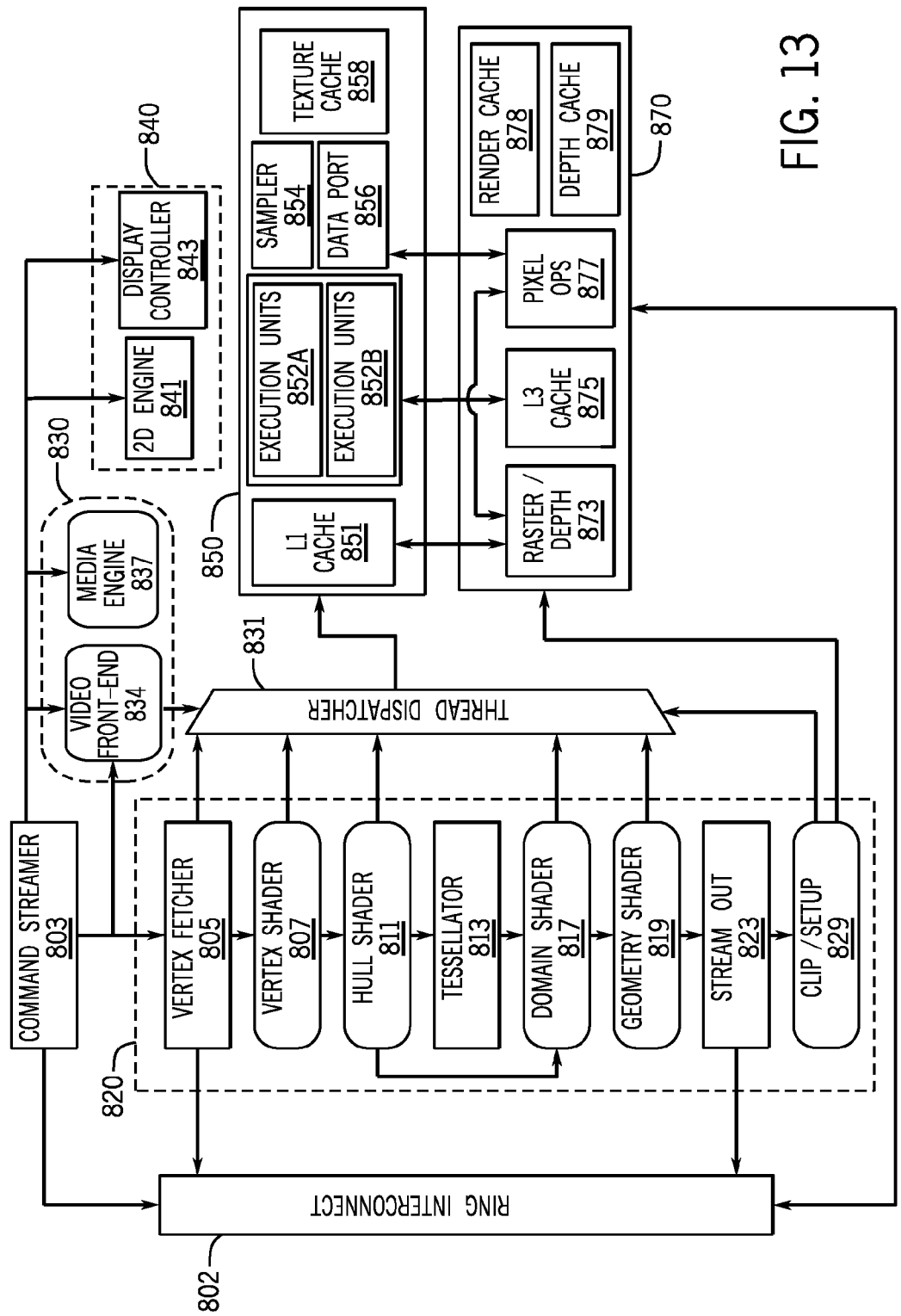
FIG. 13 is a block diagram of another embodiment of a graphics processor.

FIG. 13 is a block diagram of another embodiment of a graphics processor which includes a graphics pipeline 820, a media pipeline 830, a display engine 840, thread execution logic 850, and a render output pipeline 870. In one embodiment, the graphics processor is a graphics processor within a multi-core processing system that includes one or more general purpose processing cores. The graphics processor is controlled by register writes to one or more control registers (not shown) or via commands issued to the graphics processor via a ring interconnect 802. The ring interconnect 802 couples the graphics processor to other processing components, such as other graphics processors or general-purpose processors. Commands from the ring interconnect are interpreted by a command streamer 803 which supplies instructions to individual components of the graphics pipeline 820 or media pipeline 830.

The command streamer 803 directs the operation of a vertex fetcher 805 component that reads vertex data from memory and executes vertex-processing commands provided by the command streamer 803. The vertex fetcher 805 provides vertex data to a vertex shader 807, which performs coordinate space transformation and lighting operations to each vertex. The vertex fetcher 805 and vertex shader 807 execute vertex-processing instructions by dispatching execution threads to the execution units 852A, 852B via a thread dispatcher 831.

In one embodiment, the execution units 852A, 852B are an array of vector processors having an instruction set for performing graphics and media operations. The execution units 852A, 852B have an attached L1 cache 851 that is specific for each array or shared between the arrays. The cache can be configured as a data cache, an instruction cache, or a single cache that is partitioned to contain data and instructions in different partitions.

In one embodiment, the graphics pipeline 820 includes tessellation components to perform hardware-accelerated tessellation of 3D objects. A programmable hull shader 811 configures the tessellation operations. A programmable domain shader 817 provides back-end evaluation of tessellation output. A tessellator 813 operates at the direction of the hull shader 811 and contains special purpose logic to generate a set of detailed geometric objects based on a coarse geometric model that is provided as input to the graphics pipeline 820. If tessellation is not used, the tessellation components 811, 813, 817 can be bypassed.

The complete geometric objects can be processed by a geometry shader 819 via one or more threads dispatched to the execution units 852A, 852B, or can proceed directly to the clipper 829. The geometry shader operates on entire geometric objects, rather than vertices or patches of vertices as in previous stages of the graphics pipeline. If the tessellation is disabled the geometry shader 819 receives input from the vertex shader 807. The geometry shader 819 is programmable by a geometry shader program to perform geometry tessellation if the tessellation units are disabled.

Prior to rasterization, vertex data is processed by a clipper 829, which is either a fixed function clipper or a programmable clipper having clipping and geometry shader functions. In one embodiment, a rasterizer 873 in the render output pipeline 870 dispatches pixel shaders to convert the geometric objects into their per pixel representations. In one embodiment, pixel shader logic is included in the thread execution logic 850.

The graphics engine has an interconnect bus, interconnect fabric, or some other interconnect mechanism that allows data and message passing amongst the major components of the graphics engine. In one embodiment the execution units 852A, 852B and associated cache(s) 851, texture and media sampler 854, and texture/sampler cache 858 interconnect via a data port 856 to perform memory access and communicate with render output pipeline components of the graphics engine. In one embodiment, the sampler 854, caches 851, 858 and execution units 852A, 852B each have separate memory access paths.

In one embodiment, the render output pipeline 870 contains a rasterizer and depth test component 873 that converts vertex-based objects into their associated pixel-based representation. In one embodiment, the rasterizer logic includes a windower/masker unit to perform fixed function triangle and line rasterization. An associated render and depth buffer caches 878, 879 are also available in one embodiment. A pixel operations component 877 performs pixel-based operations on the data, though in some instances, pixel operations associated with 2D operations (e.g. bit block image transfers with blending) are performed by the 2D engine 841, or substituted at display time by the display controller 843 using overlay display planes. In one embodiment a shared L3 cache 875 is available to all graphics components, allowing the sharing of data without the use of main system memory.

The graphics processor media pipeline 830 includes a media engine 837 and a video front end 834. In one embodiment, the video front end 834 receives pipeline commands from the command streamer 803. However, in one embodiment the media pipeline 830 includes a separate command streamer. The video front-end 834 processes media commands before sending the command to the media engine 837. In one embodiment, the media engine includes thread spawning functionality to spawn threads for dispatch to the thread execution logic 850 via the thread dispatcher 831.

In one embodiment, the graphics engine includes a display engine 840. In one embodiment, the display engine 840 is external to the graphics processor and couples with the graphics processor via the ring interconnect 802, or some other interconnect bus or fabric. The display engine 840 includes a 2D engine 841 and a display controller 843. The display engine 840 contains special purpose logic capable of operating independently of the 3D pipeline. The display controller 843 couples with a display device (not shown), which may be a system integrated display device, as in a laptop computer, or an external display device attached via an display device connector.

The graphics pipeline 820 and media pipeline 830 are configurable to perform operations based on multiple graphics and media programming interfaces and are not specific to any one application programming interface (API). In one embodiment, driver software for the graphics processor translates API calls that are specific to a particular graphics or media library into commands that can be processed by the graphics processor. In various embodiments, support is provided for the Open Graphics Library (OpenGL) and Open Computing Language (OpenCL) supported by the Khronos Group, the Direct3D library from the Microsoft Corporation, or, in one embodiment, both OpenGL and D3D. Support may also be provided for the Open Source Computer Vision Library (OpenCV). A future API with a compatible 3D pipeline would also be supported if a mapping can be made from the pipeline of the future API to the pipeline of the graphics processor.

Figure 14A:
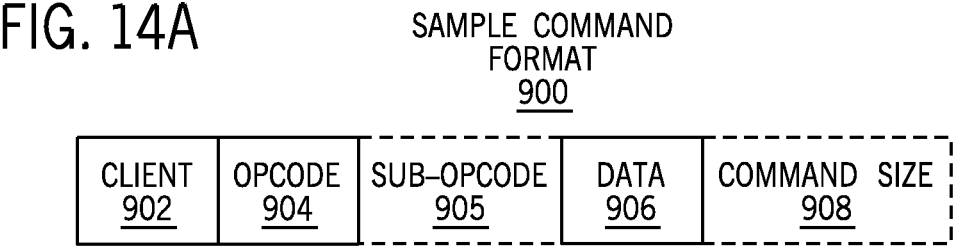
FIG. 14A is a block diagram of a graphics processor command format according to one embodiment.
Figure 14B:
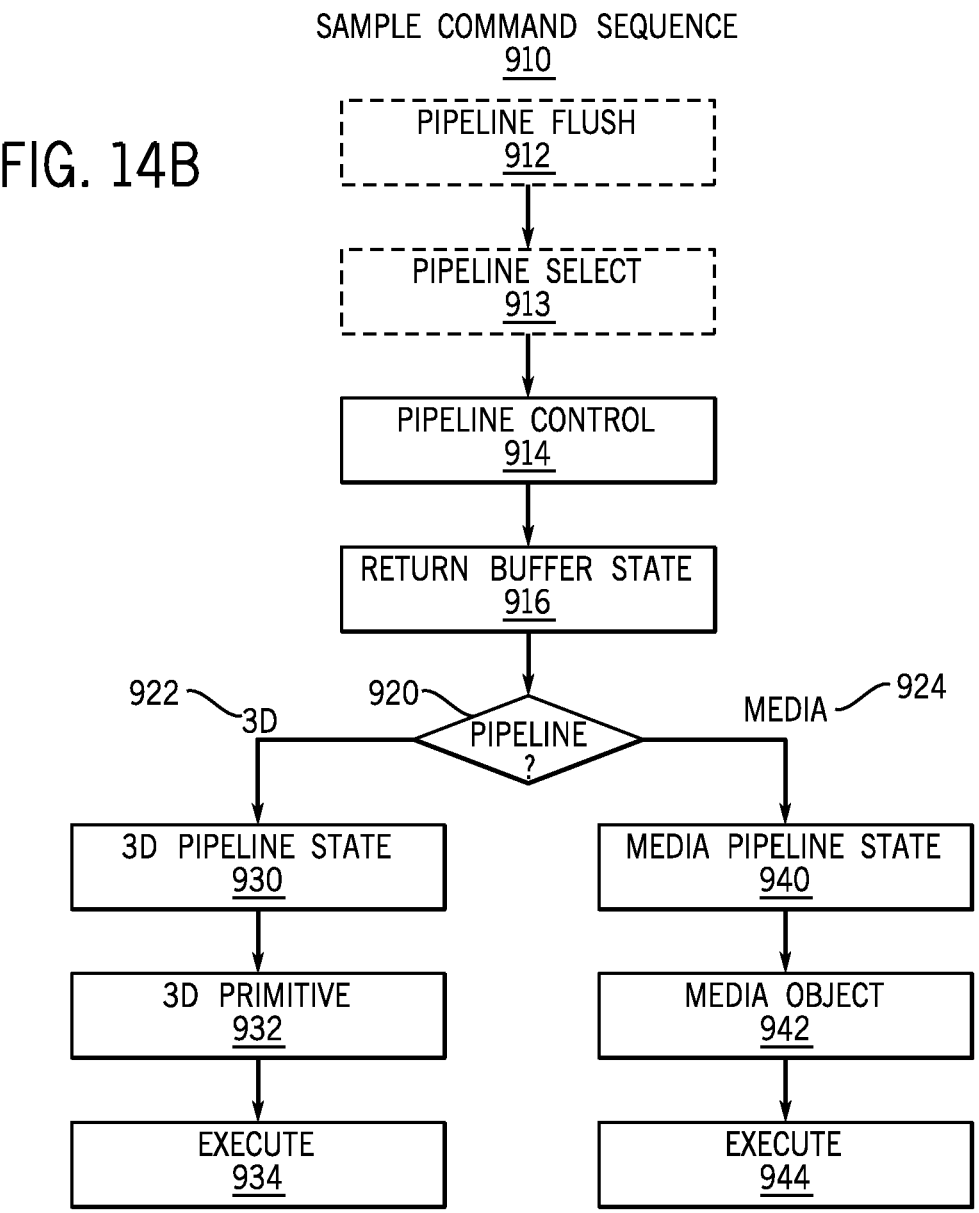
FIG. 14B is a block diagram of a graphics processor command sequence according to one embodiment.

FIG. 14A is a block diagram illustrating a graphics processor command format according to an embodiment and FIG. 14B is a block diagram illustrating a graphics processor command sequence according to an embodiment. The solid lined boxes in FIG. 14A illustrate the components that are generally included in a graphics command while the dashed lines include components that are optional or that are only included in a sub-set of the graphics commands. The exemplary graphics processor command format 900 of FIG. 14A includes data fields to identify a target client 902 of the command, a command operation code (opcode) 904, and the relevant data 906 for the command. A sub-opcode 905 and a command size 908 are also included in some commands.

The client 902 specifies the client unit of the graphics device that processes the command data. In one embodiment, a graphics processor command parser examines the client field of each command to condition the further processing of the command and route the command data to the appropriate client unit. In one embodiment, the graphics processor client units include a memory interface unit, a render unit, a 2D unit, a 3D unit, and a media unit. Each client unit has a corresponding processing pipeline that processes the commands. Once the command is received by the client unit, the client unit reads the opcode 904 and, if present, sub-opcode 905 to determine the operation to perform. The client unit performs the command using information in the data 906 field of the command. For some commands an explicit command size 908 is expected to specify the size of the command. In one embodiment, the command parser automatically determines the size of at least some of the commands based on the command opcode. In one embodiment commands are aligned via multiples of a double word.

The flow chart in FIG. 14B shows a sample command sequence 910. In one embodiment, software or firmware of a data processing system that features an embodiment of the graphics processor uses a version of the command sequence shown to set up, execute, and terminate a set of graphics operations. A sample command sequence is shown and described for exemplary purposes, however embodiments are not limited to these commands or to this command sequence. Moreover, the commands may be issued as batch of commands in a command sequence, such that the graphics processor will process the sequence of commands in an at least partially concurrent manner.

The sample command sequence 910 may begin with a pipeline flush command 912 to cause any active graphics pipeline to complete the currently pending commands for the pipeline. In one embodiment, the 3D pipeline 922 and the media pipeline 924 do not operate concurrently. The pipeline flush is performed to cause the active graphics pipeline to complete any pending commands. In response to a pipeline flush, the command parser for the graphics processor will pause command processing until the active drawing engines complete pending operations and the relevant read caches are invalidated. Optionally, any data in the render cache that is marked 'dirty' can be flushed to memory. A pipeline flush command 912 can be used for pipeline synchronization or before placing the graphics processor into a low power state.

A pipeline select command 913 is used when a command sequence requires the graphics processor to explicitly switch between pipelines. A pipeline select command 913 is required only once within an execution context before issuing pipeline commands unless the context is to issue commands for both pipelines. In one embodiment, a pipeline flush command is 912 is required immediately before a pipeline switch via the pipeline select command 913.

A pipeline control command 914 configures a graphics pipeline for operation and is used to program the 3D pipeline 922 and the media pipeline 924. The pipeline control command 914 configures the pipeline state for the active pipeline. In one embodiment, the pipeline control command 914 is used for pipeline synchronization and to clear data from one or more cache memories within the active pipeline before processing a batch of commands.

Return buffer state commands 916 are used to configure a set of return buffers for the respective pipelines to write data. Some pipeline operations require the allocation, selection, or configuration of one or more return buffers into which the operations write intermediate data during processing. The graphics processor also uses one or more return buffers to store output data and to perform cross thread communication. The return buffer state 916 includes selecting the size and number of return buffers to use for a set of pipeline operations.

The remaining commands in the command sequence differ based on the active pipeline for operations. Based on a pipeline determination 920, the command sequence is tailored to the 3D pipeline 922 beginning with the 3D pipeline state 930, or the media pipeline 924 beginning at the media pipeline state 940.

The commands for the 3D pipeline state 930 include 3D state setting commands for vertex buffer state, vertex element state, constant color state, depth buffer state, and other state variables that are to be configured before 3D primitive commands are processed. The values of these commands are determined at least in part based the particular 3D API in use. 3D pipeline state 930 commands are also able to selectively disable or bypass certain pipeline elements if those elements will not be used.

The 3D primitive 932 command is used to submit 3D primitives to be processed by the 3D pipeline. Commands and associated parameters that are passed to the graphics processor via the 3D primitive 932 command are forwarded to the vertex fetch function in the graphics pipeline. The vertex fetch function uses the 3D primitive 932 command data to generate vertex data structures. The vertex data structures are stored in one or more return buffers. The 3D primitive 932 command is used to perform vertex operations on 3D primitives via vertex shaders. To process vertex shaders, the 3D pipeline 922 dispatches shader execution threads to graphics processor execution units.

The 3D pipeline 922 is triggered via an execute 934 command or event. In one embodiment a register write triggers command execution. In one embodiment execution is triggered via a 'go' or 'kick' command in the command sequence. In one embodiment command execution is triggered using a pipeline synchronization command to flush the command sequence through the graphics pipeline. The 3D pipeline will perform geometry processing for the 3D primitives. Once operations are complete, the resulting geometric objects are rasterized and the pixel engine colors the resulting pixels. Additional commands to control pixel shading and pixel back end operations may also be included for those operations.

The sample command sequence 910 follows the media pipeline 924 path when performing media operations. In general, the specific use and manner of programming for the media pipeline 924 depends on the media or compute operations to be performed. Specific media decode operations may be offloaded to the media pipeline during media decode. The media pipeline can also be bypassed and media decode can be performed in whole or in part using resources provided by one or more general purpose processing cores. In one embodiment, the media pipeline also includes elements for general-purpose graphics processor unit (GPGPU) operations, where the graphics processor is used to perform SIMD vector operations using computational shader programs that are not explicitly related to the rendering of graphics primitives.

The media pipeline 924 is configured in a similar manner as the 3D pipeline 922. A set of media pipeline state commands 940 are dispatched or placed into in a command queue before the media object commands 942. The media pipeline state commands 940 include data to configure the media pipeline elements that will be used to process the media objects. This includes data to configure the video decode and video encode logic within the media pipeline, such as encode or decode format. The media pipeline state commands 940 also support the use one or more pointers to "indirect" state elements that contain a batch of state settings.

Media object commands 942 supply pointers to media objects for processing by the media pipeline. The media objects include memory buffers containing video data to be processed. In one embodiment, all media pipeline state must be valid before issuing a media object command 942. Once the pipeline state is configured and media object commands 942 are queued, the media pipeline 924 is triggered via an execute 934 command or an equivalent execute event (e.g., register write). Output from the media pipeline 924 may then be post processed by operations provided by the 3D pipeline 922 or the media pipeline 924. In one embodiment, GPGPU operations are configured and executed in a similar manner as media operations.

Figure 15:
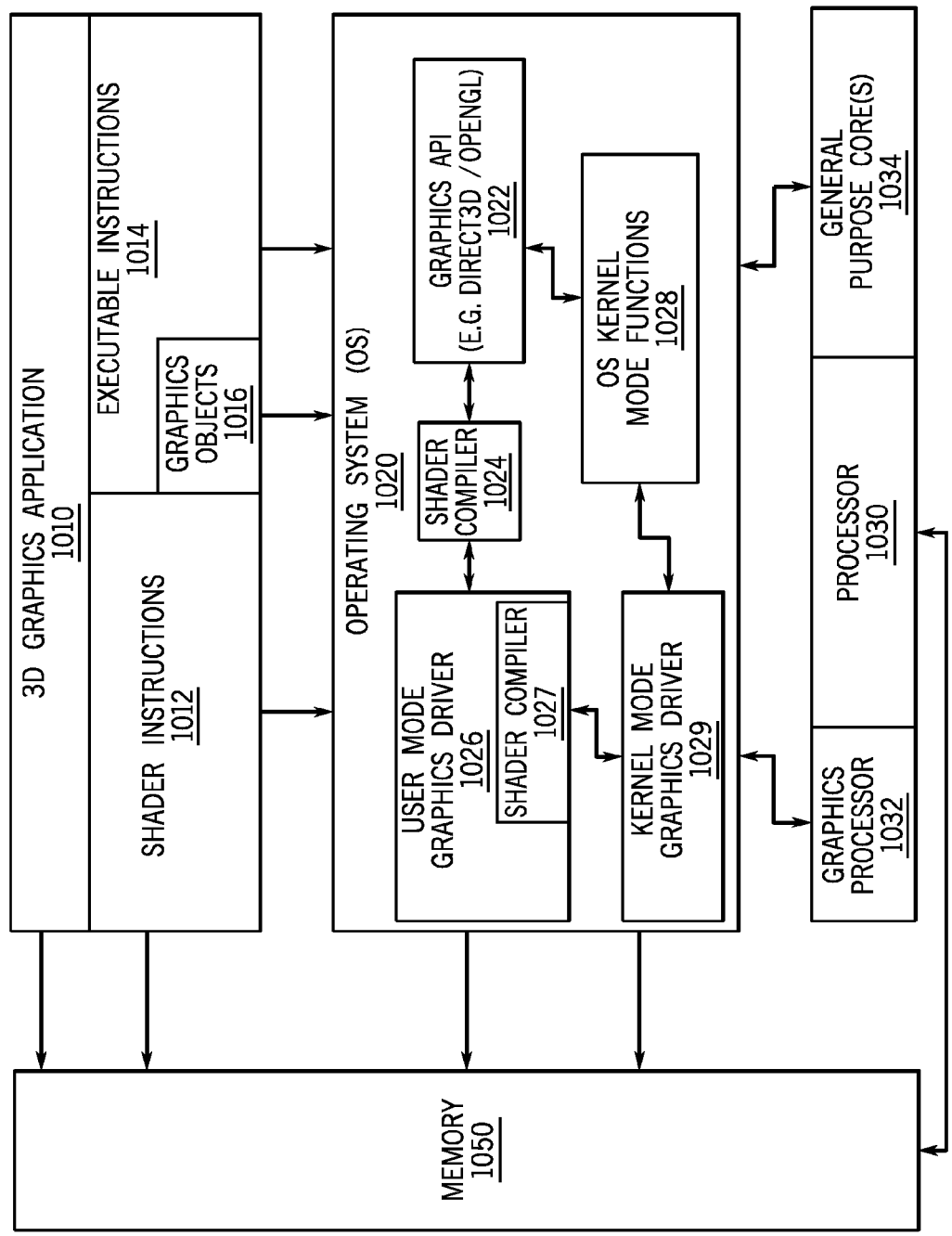
FIG. 15 is a graphics software architecture for one embodiment.

FIG. 15 illustrates exemplary graphics software architecture for a data processing system according to an embodiment. The software architecture includes a 3D graphics application 1010, an operating system 1020, and at least one processor 1030. The processor 1030 includes a graphics processor 1032 and one or more general-purpose processor core(s) 1034. The graphics application 1010 and operating system 1020 each execute in the system memory 1050 of the data processing system.

In one embodiment, the 3D graphics application 1010 contains one or more shader programs including shader instructions 1012. The shader language instructions may be in a high-level shader language, such as the High Level Shader Language (HLSL) or the OpenGL Shader Language (GLSL). The application also includes executable instructions 1014 in a machine language suitable for execution by the general-purpose processor core 1034. The application also includes graphics objects 1016 defined by vertex data.

The operating system 1020 may be a Microsoft® Windows® operating system from the Microsoft Corporation, a proprietary UNIX-like operating system, or an open source UNIX-like operating system using a variant of the Linux kernel. When the Direct3D API is in use, the operating system 1020 uses a front-end shader compiler 1024 to compile any shader instructions 1012 in HLSL into a lower-level shader language. The compilation may be a just-in-time compilation or the application can perform share pre-compilation. In one embodiment, high-level shaders are compiled into low-level shaders during the compilation of the 3D graphics application 1010.

The user mode graphics driver 1026 may contain a back-end shader compiler 1027 to convert the shader instructions 1012 into a hardware specific representation. When the OpenGL API is in use, shader instructions 1012 in the GLSL high-level language are passed to a user mode graphics driver 1026 for compilation. The user mode graphics driver uses operating system kernel mode functions 1028 to communicate with a kernel mode graphics driver 1029. The kernel mode graphics driver 1029 communicates with the graphics processor 1032 to dispatch commands and instructions.

To the extent various operations or functions are described herein, they can be described or defined as hardware circuitry, software code, instructions, configuration, and/or data. The content can be embodied in hardware logic, or as directly executable software ("object" or "executable" form), source code, high level shader code designed for execution on a graphics engine, or low level assembly language code in an instruction set for a specific processor or graphics core. The software content of the embodiments described herein can be provided via an article of manufacture with the content stored thereon, or via a method of operating a communication interface to send data via the communication interface.

A non-transitory machine readable storage medium can cause a machine to perform the functions or operations described, and includes any mechanism that stores information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface is configured by providing configuration parameters or sending signals to prepare the communication interface to provide a data signal describing the software content. The communication interface can be accessed via one or more commands or signals sent to the communication interface.

Various components described can be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc. Besides what is described herein, various modifications can be made to the disclosed embodiments and implementations of the invention without departing from their scope. Therefore, the illustrations and examples herein should be construed in an illustrative, and not a restrictive sense. The scope of the invention should be measured solely by reference to the claims that follow.

The following clauses and/or examples pertain to further embodiments:

One example embodiment may be a method comprising calculating position attributes and culling triangles before calculating shading attributes other than position attributes. The method may also include where culling includes simple cull tests and view frustum culling. The method may also include recording visibility information in chronological order and using this information to skip discarded triangles. The method may also include recording said visibility information in a bitwise sequence. The method may also include recording a depth representation per tile in order to perform occlusion culling before calculating said position attributes. The method may also include generating occlusion information when calculating position attributes for triangles that are not fully occluded. The method may also include setting a bit in a draw call command to indicate whether the command is to be handled during calculating or culling. The method may also include occlusion culling by using said occlusion information by storing maximum and minimum depths as scalar values per tile. The method may also include occlusion culling by storing a masked depth representation, using a bitmask and a set of Zmax-values per tile. The method may also include culling by storing one bit per tile to indicate if a reference value represents a minimum or maximum depth. The method may also include performing a first depth test as a part of calculating position attributes and then a second depth test during culling after determining position attributes. The method may also include supplying a depth representation from the first depth test for use in the second depth test. The method may also include using the depth representation from the first depth test in the second depth test pipe to prime a zbuffer to save pixel shader executions. The method may also include calculating and culling in parallel pipes. The method may also include wherein calculating and culling are done in one pipe and a bit sequence recording visibility information is consumed in the other pipe. The method may also include selectively disabling recording visibility information for a draw call. The method may also include selectively enabling all attributes to be calculated in one pass for at least one draw call rather than calculating position attributes before other shading attributes. The method may also include wherein calculating position attributes includes reading out only position attributes and not reading out any other shading attributes for purposes of calculating position attributes. The method may also include clipping primitives during triangle culling and marking all triangles as visible when calculating position attributes. The method may also include calculating position attributes using an instruction set that does not include instructions for calculating non-position attributes.

Another example embodiment may be one or more non-transitory computer readable media storing instructions executed by a processor to perform a sequence comprising calculating position attributes and culling triangles before calculating shading attributes other than position attributes. The media may further store instructions where culling includes simple cull tests and view frustum culling. The media may further store said sequence including recording visibility information in chronological order and using this information to skip discarded triangles. The media may further store said sequence including recording said visibility information in a bitwise sequence. The media may include said sequence including recording a depth representation per tile in order to perform occlusion culling before calculating said position attributes. The media may include said sequence including generating occlusion information when calculating position attributes for triangles that are not fully occluded. The media may include said sequence including setting a bit in a draw call command to indicate whether the command is to be handled during calculating or culling. The media may include said sequence including occlusion culling by using said occlusion information by storing maximum and minimum depths as scalar values per tile. The media may include said sequence including occlusion culling by storing a masked depth representation, using a bitmask and a set of Zmax-values per tile. The media may include said sequence including culling by storing one bit per tile to indicate if a reference value represents a minimum or maximum depth. The media may include said sequence including performing a first depth test as a part of calculating position attributes and then a second depth test during culling after determining position attributes. The media may include said sequence including supplying a depth representation from the first depth test for use in the second depth test. The media may include said sequence including using the depth representation from the first depth test in the second depth test pipe to prime a zbuffer to save pixel shader executions. The media may include said sequence including calculating and culling in parallel pipes. The media may include said sequence wherein calculating and culling are done in one pipe and a bit sequence recording visibility information is consumed in the other pipe. The media may include said sequence including selectively disabling recording visibility information for a draw call. The media may include said sequence including selectively enabling all attributes to be calculated at once for at least one draw call rather than calculating position attributes before other shading attributes. The media may include said sequence wherein calculating position attributes including reading out only position attributes and not reading out any other shading attributes for purposes of calculating position attributes. The media may include said sequence including clipping primitives during triangle culling and marking all triangles as visible when calculating position attributes. The media may include said sequence including calculating position attributes using an instruction set that does not include instructions for calculating non-position attributes.

In another example embodiment may be an apparatus comprising a processor to calculate position attributes and cull triangles before calculating shading attributes other than position attributes and a storage coupled to said processor. The apparatus may include said processor to cull using simple cull tests and view frustum culling. The apparatus may include said processor to record visibility information in chronological order and using this information to skip discarded triangles. The apparatus may include said processor to record said visibility information in a bitwise sequence. The apparatus may include said processor to record a depth representation per tile in order to perform occlusion culling before calculating said position attributes. The apparatus may include said processor to generate occlusion information when calculating position attributes for triangles that are not fully occluded. The apparatus may include said processor to set a bit in a draw call command to indicate whether the command is to be handled during calculating or culling. The apparatus may include said processor to occlusion cull by using said occlusion information by storing maximum and minimum depths as scalar values per tile. The apparatus may include said processor to occlusion cull by storing a masked depth representation, using a bitmask and a set of Zmax-values per tile. The apparatus may include said processor to cull by storing one bit per tile to indicate if a reference value represents a minimum or maximum depth. The apparatus may include said processor to perform a first depth test as a part of calculating position attributes and then a second depth test during culling after determining position attributes. The apparatus may include said processor to supply a depth representation from the first depth test for use in the second depth test. The apparatus may include said processor to use the depth representation from the first depth test in the second depth test pipe to prime a zbuffer to save pixel shader executions. The apparatus may include said processor to calculate and cull in parallel pipes. The apparatus may include said processor to calculate and cull in one pipe and consume a bit sequence recording visibility information in the other pipe. The apparatus may include an operating system, a battery and firmware and a module to update said firmware.

The graphics processing techniques described herein may be implemented in various hardware architectures. For example, graphics functionality may be integrated within a chipset. Alternatively, a discrete graphics processor may be used. As still another embodiment, the graphics functions may be implemented by a general purpose processor, including a multicore processor.

References throughout this specification to "one embodiment" or "an embodiment" mean that a particular feature, structure, or characteristic described in connection with the embodiment is included in at least one implementation encompassed within the present disclosure. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While a limited number of embodiments have been described, those skilled in the art will appreciate numerous modifications and variations therefrom. It is intended that the appended claims cover all such modifications and variations as fall within the true spirit and scope of this disclosure.

What is claimed is:

1. A method comprising:
   calculating position attributes;
   culling triangles in a cull pipe without tessellation before calculating shading attributes other than position attributes; and
   setting a bit in a draw call command to indicate whether the command is to be handled during calculating or culling to enable handling draw calls that require tessellation with a cull pipe without tessellation.

2. The method of claim 1, where culling includes simple cull tests and view frustum culling.

3. The method of claim 1 including recording visibility information in chronological order and using this information to skip discarded triangles.

4. The method of claim 3 including recording said visibility information in a bitwise sequence.

5. The method of claim 3 including recording a depth representation per tile in order to perform occlusion culling before calculating said position attributes.

6. The method of claim 3 including generating occlusion information when calculating position attributes for triangles that are not fully occluded.

7. The method of claim 1 including occlusion culling by using said occlusion information by storing maximum and minimum depths as scalar values per tile.

8. The method of claim 1 including occlusion culling by storing a masked depth representation, using a bitmask and a set of Zmax-values per tile.

9. The method of claim 1 including culling by storing one bit per tile to indicate if a reference value represents a minimum or maximum depth.

10. The method of claim 1 including performing a first depth test as a part of calculating position attributes and then a second depth test during culling after determining position attributes.

11. The method of claim 10 including supplying a depth representation from the first depth test for use in the second depth test.

12. The method of claim 11 including using the depth representation from the first depth test in the second depth test pipe to prime a zbuffer to save pixel shader executions.

13. The method of claim 1 including calculating and culling in parallel pipes.

14. The method of claim 13 wherein calculating and culling are done in one pipe and a bit sequence recording visibility information is consumed in the other pipe.

15. The method of claim 1 including selectively disabling recording visibility information for a draw call.

16. The method of claim 1 including selectively enabling all attributes to be calculated in one pass for at least one draw call rather than calculating position attributes before other shading attributes.

17. The method of claim 1 wherein calculating position attributes includes reading out only position attributes and not reading out any other shading attributes for purposes of calculating position attributes.

18. The method of claim 1 including clipping primitives during triangle culling and marking all triangles as visible when calculating position attributes.

19. The method of claim 1 including calculating position attributes using an instruction set that does not include instructions for calculating non-position attributes.

20. One or more non-transitory computer readable media storing instructions executed by a processor to perform a sequence comprising:
calculating position attributes;
culling triangles in a cull pipe without tessellation before calculating shading attributes other than position attributes; and
setting a bit in a draw call command to indicate whether the command is to be handled during calculating or culling to enable handling draw calls that require tessellation with a cull pipe without tessellation.

21. The media of claim 20, where culling includes simple cull tests and view frustum culling.

22. The media of claim 20, said sequence including recording visibility information in chronological order and using this information to skip discarded triangles.

23. The media of claim 22, said sequence including recording said visibility information in a bitwise sequence.

24. The media of claim 22, said sequence including recording a depth representation per tile in order to perform occlusion culling before calculating said position attributes.

25. The media of claim 22, said sequence including generating occlusion information when calculating position attributes for triangles that are not fully occluded.

26. The media of claim 20, said sequence including occlusion culling by using said occlusion information by storing maximum and minimum depths as scalar values per tile.

27. The media of claim 20, said sequence including occlusion culling by storing a masked depth representation, using a bitmask and a set of Zmax-values per tile.

28. The media of claim 20, said sequence including culling by storing one bit per tile to indicate if a reference value represents a minimum or maximum depth.

29. The media of claim 20, said sequence including performing a first depth test as a part of calculating position attributes and then a second depth test during culling after determining position attributes.

30. The media of claim 29, said sequence including supplying a depth representation from the first depth test for use in the second depth test.

31. The media of claim 30, said sequence including using the depth representation from the first depth test in the second depth test pipe to prime a zbuffer to save pixel shader executions.

32. The media of claim 20, said sequence including calculating and culling in parallel pipes.

33. The media of claim 32 wherein calculating and culling are done in one pipe and a bit sequence recording visibility information is consumed in the other pipe.

34. The media of claim 20, said sequence including selectively disabling recording visibility information for a draw call.

35. The media of claim 20, said sequence including selectively enabling all attributes to be calculated at once for at least one draw call rather than calculating position attributes before other shading attributes.

36. The media of claim 20 wherein calculating position attributes including reading out only position attributes and not reading out any other shading attributes for purposes of calculating position attributes.

37. The media of claim 20, said sequence including clipping primitives during triangle culling and marking all triangles as visible when calculating position attributes.

38. The media of claim 20, said sequence including calculating position attributes using an instruction set that does not include instructions for calculating non-position attributes.

39. An apparatus comprising:
a processor to calculate position attributes, cull triangles in a cull pipe without tessellation before calculating shading attributes other than position attributes, and set a bit in a draw call command to indicate whether the command is to be handled during calculating or culling to enable handling draw calls that require tessellation with a cull pipe without tessellation; and
a storage coupled to said processor.

40. The apparatus of claim 39, said processor to cull using simple cull tests and view frustum culling.

41. The apparatus of claim 39, said processor to record visibility information in chronological order and using this information to skip discarded triangles.

42. The apparatus of claim 41, said processor to record said visibility information in a bitwise sequence.

43. The apparatus of claim 41, said processor to record a depth representation per tile in order to perform occlusion culling before calculating said position attributes.

44. The apparatus of claim 41, said processor to generate occlusion information when calculating position attributes for triangles that are not fully occluded.

45. The apparatus of claim 39, said processor to occlusion cull by using said occlusion information by storing maximum and minimum depths as scalar values per tile.

46. The apparatus of claim 39, said processor to occlusion cull by storing a masked depth representation, using a bitmask and a set of Zmax-values per tile.

47. The apparatus of claim 39, said processor to cull by storing one bit per tile to indicate if a reference value represents a minimum or maximum depth.

48. The apparatus of claim 39, said processor to perform a first depth test as a part of calculating position attributes and then a second depth test during culling after determining position attributes.

49. The apparatus of claim 48, said processor to supply a depth representation from the first depth test for use in the second depth test.

50. The apparatus of claim 49, said processor to use the depth representation from the first depth test in the second depth test pipe to prime a zbuffer to save pixel shader executions.

51. The apparatus of claim 39, said processor to calculate and cull in parallel pipes.

52. The apparatus of claim 51, said processor to calculate and cull in one pipe and consume a bit sequence recording visibility information in the other pipe.

53. The apparatus of claim 39 including an operating system.

54. The apparatus of claim 39 including a battery.

55. The apparatus of claim 39 including firmware and a module to update said firmware.

* * * * *